United States Patent
Pornprasitsakul et al.

(10) Patent No.: US 9,696,881 B2
(45) Date of Patent: Jul. 4, 2017

(54) SYSTEM AND METHOD FOR CAPTIONING MEDIA

(71) Applicant: Viki, Inc., San Francisco, CA (US)

(72) Inventors: Nuttanart Pornprasitsakul, Nai-muang (TH); Sunjin Lee, Geumsan Villa (KR)

(73) Assignee: Viki, Inc., San Francisco, CA (US)

( * ) Notice: Subject to any disclaimer, the term of this patent is extended or adjusted under 35 U.S.C. 154(b) by 35 days.

(21) Appl. No.: 13/970,034

(22) Filed: Aug. 19, 2013

(65) Prior Publication Data

US 2014/0201631 A1   Jul. 17, 2014

Related U.S. Application Data

(60) Provisional application No. 61/754,926, filed on Jan. 21, 2013, provisional application No. 61/752,816, filed on Jan. 15, 2013.

(51) Int. Cl.
| | |
|---|---|
| *G06F 3/048* | (2013.01) |
| *G06F 3/0484* | (2013.01) |
| *G06F 17/28* | (2006.01) |
| *G11B 27/031* | (2006.01) |
| *G11B 27/10* | (2006.01) |

(52) U.S. Cl.
CPC .......... *G06F 3/0484* (2013.01); *G06F 17/289* (2013.01); *G11B 27/031* (2013.01); *G11B 27/10* (2013.01); *G09G 2340/125* (2013.01)

(58) Field of Classification Search
CPC ..... G06F 3/0484; G06F 17/289; G11B 27/10; G11B 27/031; G09G 2340/125
See application file for complete search history.

(56) References Cited

U.S. PATENT DOCUMENTS

| 8,468,149 | B1* | 6/2013 | Lung et al. ................ 707/713 |
| 8,848,109 | B2* | 9/2014 | Pornprasitsakul .... G06F 3/0484 |
| | | | 348/468 |
| 2003/0004968 | A1 | 1/2003 | Romer et al. |
| 2004/0098754 | A1 | 5/2004 | Vella et al. |
| 2007/0136777 | A1 | 6/2007 | Hasek et al. |
| 2007/0266304 | A1* | 11/2007 | Fletcher et al. .......... 715/500.1 |
| 2008/0052069 | A1 | 2/2008 | Flanagan et al. |

(Continued)

FOREIGN PATENT DOCUMENTS

| JP | 2005-129971 | 5/2005 |
| JP | 2010-157961 | 7/2010 |

(Continued)

OTHER PUBLICATIONS

"How to Write Advertisements that Sell", by System, the Magazine of Business, Copyright 1912, by A.W. Shaw Company.

(Continued)

*Primary Examiner* — Doon Chow
*Assistant Examiner* — Andrew T Chiusano
(74) *Attorney, Agent, or Firm* — Lessani Law Group, PC

(57) ABSTRACT

A method for collaboratively captioning streamed media, the method including: rendering a visual representation of the audio at a first device, receiving segment parameters for a first media segment from the first device, rendering the visual representation of the audio at a second device, the second device different from the first device, and receiving a caption for the first media segment from the second device.

21 Claims, 16 Drawing Sheets

(56) References Cited

U.S. PATENT DOCUMENTS

| | | |
|---|---|---|
| 2008/0129865 A1* | 6/2008 | Leonard .................... 348/468 |
| 2008/0154908 A1* | 6/2008 | Datar et al. .................. 707/10 |
| 2009/0037263 A1 | 2/2009 | Patil |
| 2009/0193032 A1 | 7/2009 | Pyper |
| 2009/0210779 A1* | 8/2009 | Badoiu et al. ............... 715/230 |
| 2009/0265212 A1 | 10/2009 | Hyman et al. |
| 2009/0319516 A1 | 12/2009 | Igelman et al. |
| 2009/0327856 A1* | 12/2009 | Mouilleseaux et al. ...... 715/230 |
| 2010/0121682 A1 | 5/2010 | Abboa-Offei |
| 2010/0194979 A1 | 8/2010 | Blumenschein et al. |
| 2010/0313113 A1* | 12/2010 | Chen ................. G06F 17/30241 715/230 |
| 2011/0126126 A1* | 5/2011 | Blair ........................... 715/752 |
| 2011/0179385 A1 | 7/2011 | Li et al. |
| 2011/0239119 A1 | 9/2011 | Phillips et al. |
| 2012/0017153 A1* | 1/2012 | Matsuda et al. ............ 715/725 |
| 2012/0054619 A1* | 3/2012 | Spooner ............. G11B 27/034 715/723 |
| 2012/0059726 A1 | 3/2012 | Kumble |
| 2012/0158492 A1 | 6/2012 | Ye et al. |
| 2012/0163770 A1 | 6/2012 | Kaiser et al. |
| 2012/0321271 A1 | 12/2012 | Baldwin et al. |
| 2013/0004138 A1 | 1/2013 | Kilar et al. |
| 2013/0124186 A1 | 5/2013 | Donabedian et al. |
| 2013/0145269 A1* | 6/2013 | Latulipe ................ G06F 3/048 715/720 |
| 2013/0308922 A1* | 11/2013 | Sano .................. H04N 21/4316 386/245 |
| 2014/0115440 A1* | 4/2014 | Datar et al. .................... 715/230 |
| 2014/0142918 A1* | 5/2014 | Dotterer ............. G06F 17/2836 704/2 |
| 2014/0143218 A1* | 5/2014 | Sanghavi .......... G06F 17/30038 707/695 |
| 2014/0198252 A1 | 7/2014 | Pornprasitsakul et al. |
| 2014/0337126 A1 | 11/2014 | Ohanyan et al. |
| 2014/0376887 A1* | 12/2014 | Tijssen et al. ................ 386/282 |

FOREIGN PATENT DOCUMENTS

| | | |
|---|---|---|
| JP | 2013-007988 | 1/2013 |
| WO | 2009097492 A1 | 8/2009 |
| WO | 2012129336 A1 | 9/2012 |

OTHER PUBLICATIONS

European Search Report in corresponding European Application No. 13871995.0 dated Jul. 22, 2016.

* cited by examiner

SYSTEM AND METHOD FOR CAPTIONING MEDIA

CROSS-REFERENCE TO RELATED APPLICATIONS

This application claims the benefit of U.S. Provisional Application No. 61/754,926 filed 21 Jan. 2013, and U.S. Provisional Application No. 61/752,816 filed 15 Jan. 2013, which are incorporated in their entirety by this reference.

TECHNICAL FIELD

This invention relates generally to the media captioning field, and more specifically to a new and useful system and method for translating media captions in the media captioning field.

BACKGROUND

With the popularity of online video streaming, people are gaining access to video and media produced all over the world. Before, video was sometimes produced for consumption only in one nation or region. Now, people across the world are exposed to and consume content made in other countries. Despite the Internet enabling wide spread distribution, access to media content can still be limited through language barriers. If media is not translated into a language understood by the intended viewer, the video would likely not be viewed. Translating media to another language can be a slow and difficult process. There are many nuances of language that one translation cannot capture. Thus, there is a need in the captioning field to create a new and useful system and method for translating media captions. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Collaborative Media Captioning and Segmentation

Figure 1:
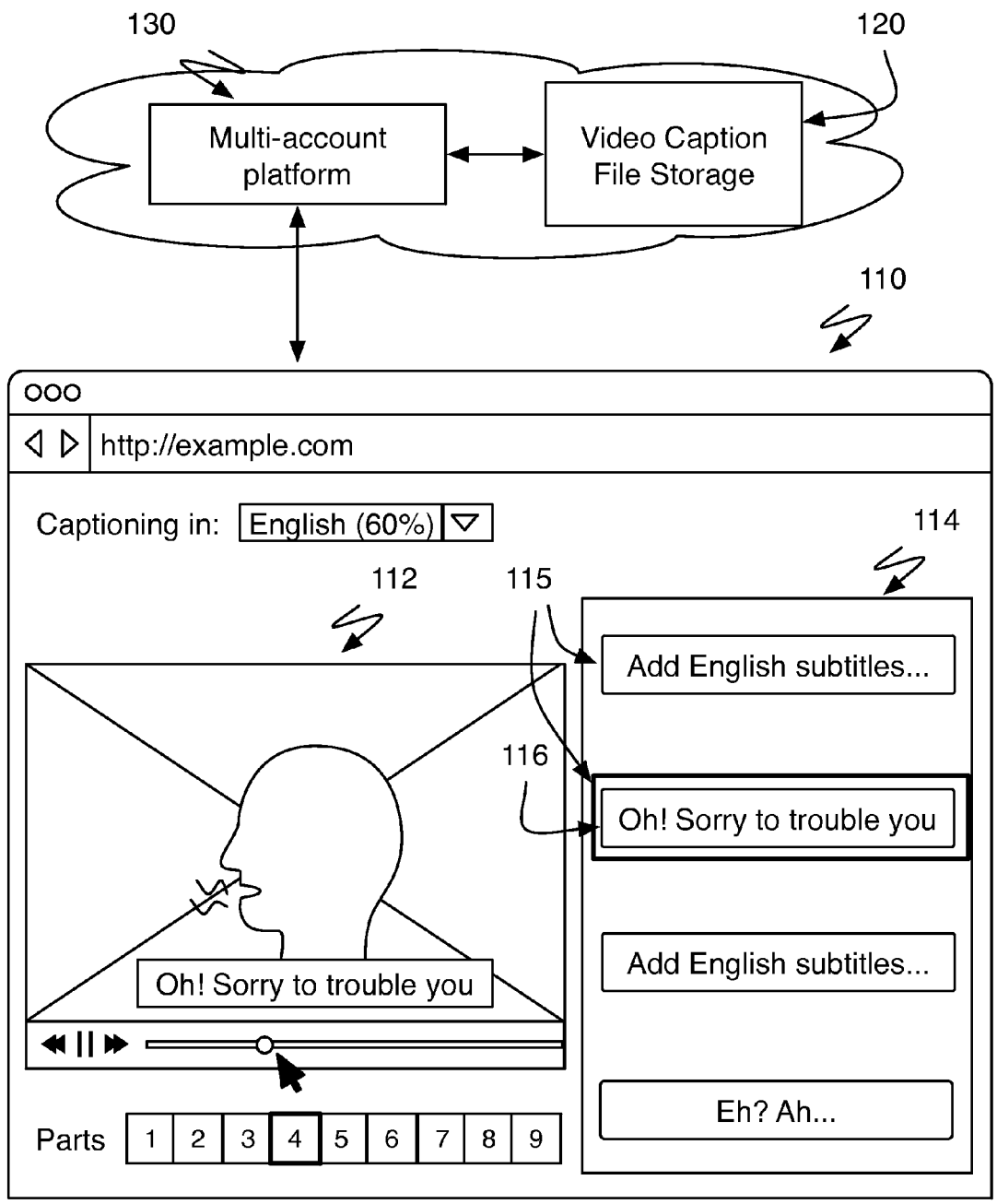
FIG. 1 is a schematic representation of an example of a media captioning variation of the system.
Figure 2:
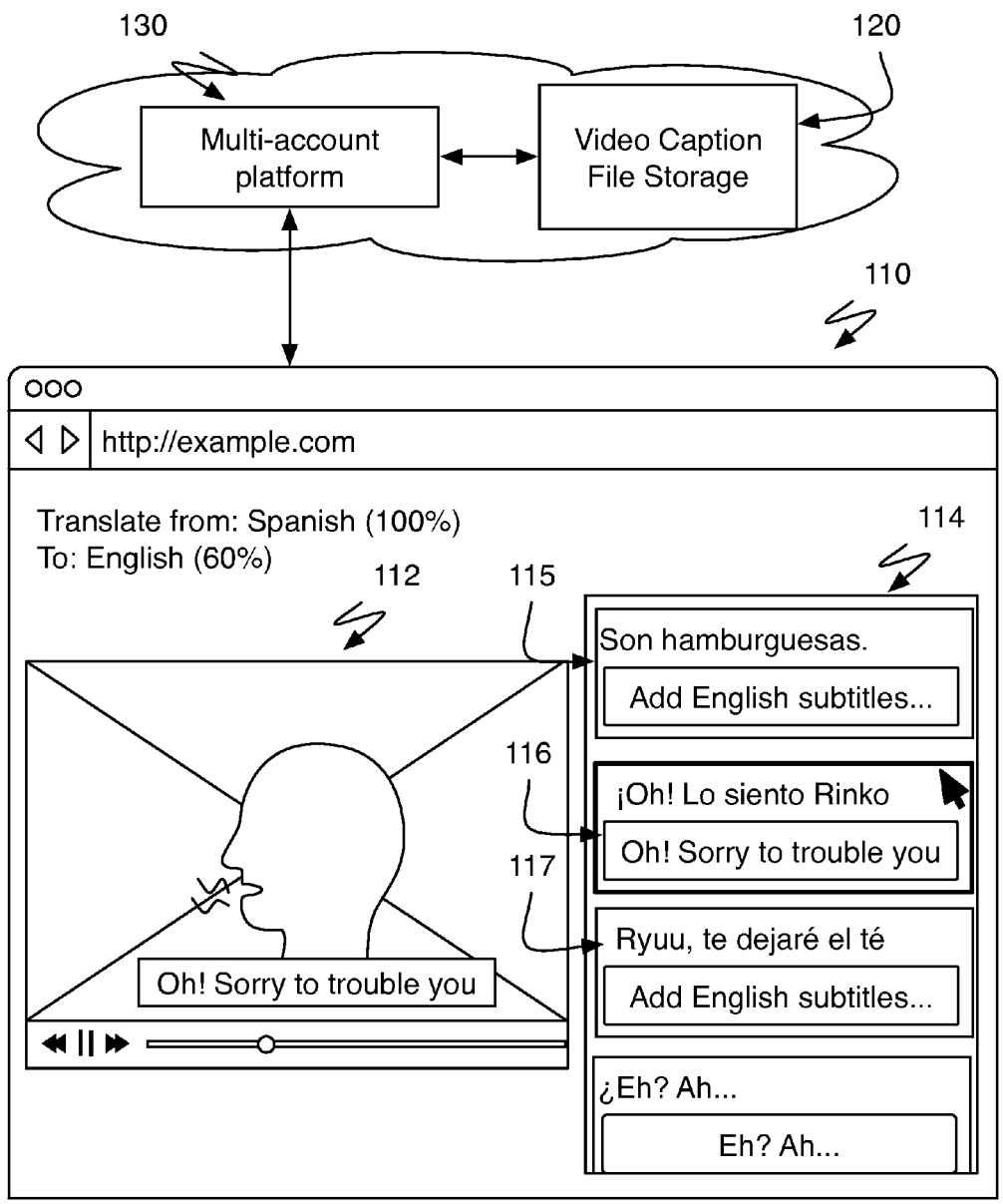
FIG. 2 is a schematic representation of an example of a second media captioning variation of the system.

As shown in FIG. 1, a system for generating media captions can include a media interface no including a media player 112 controllably coupled to caption stream interface 114. The system functions to create an easy and efficient interface to translate captions for a media file. The system is typically used in subtitling a media file to a plurality of languages through participation of multiple account entities. Playback of the media in the media player 112 preferably plays in cooperation with the caption stream interface 114. The system preferably generates one or more sets of captions, wherein each caption is preferably in a different language. The caption sets can be generated from the media (e.g., as shown in FIG. 1), or can be generated (e.g., translated) from another caption set (e.g., as shown in FIG. 2). The initial captions can be used as reference in combination with the media to collect translations/captions for at least a second set of captions. The system preferably enables subtitling through a multi-account online platform 130. The online platform is preferably a network accessible service accessible through a website or other suitable application. By enabling multiple users to participate in the subtitling, the quality, efficiency, and scale of subtitling media can be increased. The system can be implemented in a video streaming platform. In a typical application, the video streaming platform can have a large variety of videos and a globally or culturally diverse viewership; thus necessitating the localization/translation of numerous videos to appeal to the diverse viewers. Employees, volunteers, casual viewers, viewers with considerable language knowledge, viewers with limited language knowledge can all participate in captioning and/or translating media. In one preferred embodiment, the caption stream interface 114 can be configured as a selectable mode of operation of a regular video player. When watching video, a viewer can be able to selectively activate the caption stream interface 114 and contribute to translation of all or a portion of the media.

The interface no is an interface configured for consumption of media and capturing at least one segment of the video. The interface no is preferably implemented through web application technologies and can be rendered in a website. The interface no can alternatively be implemented through native application code operable on a personal computing device, mobile computing device, or any suitable device. As mentioned above the interface no preferably includes at least a media player 112 that is controllably coupled to the caption stream interface 114.

The media player 112 functions to play the media for user consumption. The media player 112 preferably includes conventional media player controls such as a play/pause button, a fast forward button, rewind button, next chapter button, previous chapter button, volume controls, playback progress bar, playback speed controls, media options menu, and/or any suitable media controls. The media player is preferably a video player that plays a video file and outputs audio through an audio channel supplied by an operating system. The media player 112 is preferably adjacent to the caption stream interface 114 as shown in FIG. 1, but the media player 112 and the caption stream interface 114 can alternatively be arranged and rendered in any suitable positional or navigational layout.

The caption stream interface 114 functions to provide an interface for captioning media segments. The caption stream interface is preferably a scrollable list view of a plurality of caption inputs 115. A caption input 115 preferably includes a caption input 116 and can include at least one reference caption (e.g., in a different language). The caption input 115 is preferably associated with a media segment. A media segment is preferably a portion of a caption set that is associated with a particular time window of the media and has set caption content (e.g., transcription and/or translation of speech). The caption input 116 can additionally enable customized caption positioning, formatting, and other suitable aspects of a caption. A caption input 115 can additionally include other user interface components to enable caption rating, flagging, commenting, editing, reviewing, or any suitable action associated with captioning. The caption stream scroll position and caption input selection is preferably controllably coupled to the media player 112. The caption stream interface 114 preferably scrolls to show a caption input of the current play position of the media, and conversely, the play position of the media can change to correspond to the current scroll position of the caption stream interface 114 or the currently selected caption input 115. The caption stream interface 114 can additionally be selectively displayed in a number of modes. In a first mode, the caption stream interface 114 can be substantially hidden, and the media player 112 is displayed in full width in a frame. In a second mode, a frame/window is split between a caption stream interface 114 and a media player 112 such that both are substantially viewable and substantially fully functional. In a third mode, the caption stream interface 114 can be displayed in a full frame/window mode. In the third mode, the media player can be hidden or played in a substantially small window (e.g., less than 400×400 window). The third mode can additionally enable other caption editing tools such as spell/grammar check, term glossary, chat window, revision history, or other tools. Any suitable number of viewing modes and feature configuration can alternatively be used.

The system can additionally include a caption file 120. The caption file can be a data object(s) or alternatively be characterized in a data model(s). A caption file 120 is preferably configured to characterize at least one set of captions for a media file. Preferably at least a reference caption and/or a translated caption is included in the caption file 120. The captions are preferably divided into a plurality of media segments, but can alternatively include a list of captions each associated with a start time, end time, video frame, keyframe, and/or scene. A media segment is preferably a portion of the media between a start and end time that is synchronized to display caption text against or over another media (e.g., video). Each media segment is preferably associated with one or more captions in the caption file 120. Other aspects of captions such as edit history, contributing accounts or source, translation score, or any suitable caption related information can additionally be characterized in the caption file 120. A caption file 120 can be used in displaying captions during media playback and/or in generating caption stream interface 114. The caption file 120 can be created or updated through the editing of caption inputs 115 in the caption stream interface 114. The caption file 120 is preferably a soft captioning file that characterizes the timing and content of each media segment. In other variations, the caption file 120 can be a hard caption file (e.g., video file with caption text merged with appropriate video frames), pre-rendered caption file (e.g., video frames of text can be overlain on top of the video) or be any suitable format.

Figure 3:
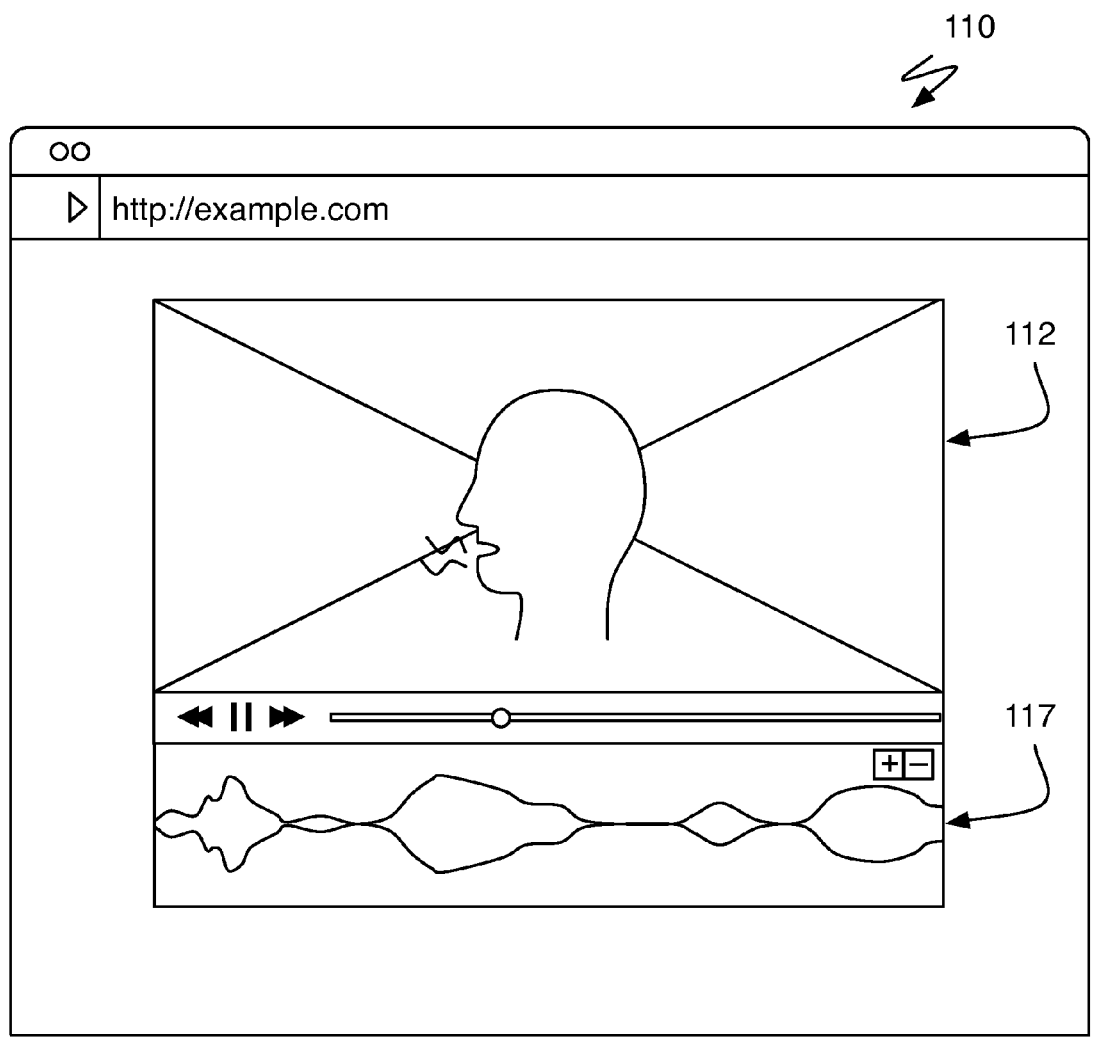
FIGS. 3-5 are schematic representations of examples of media segmentation variations of the system.
Figure 4:
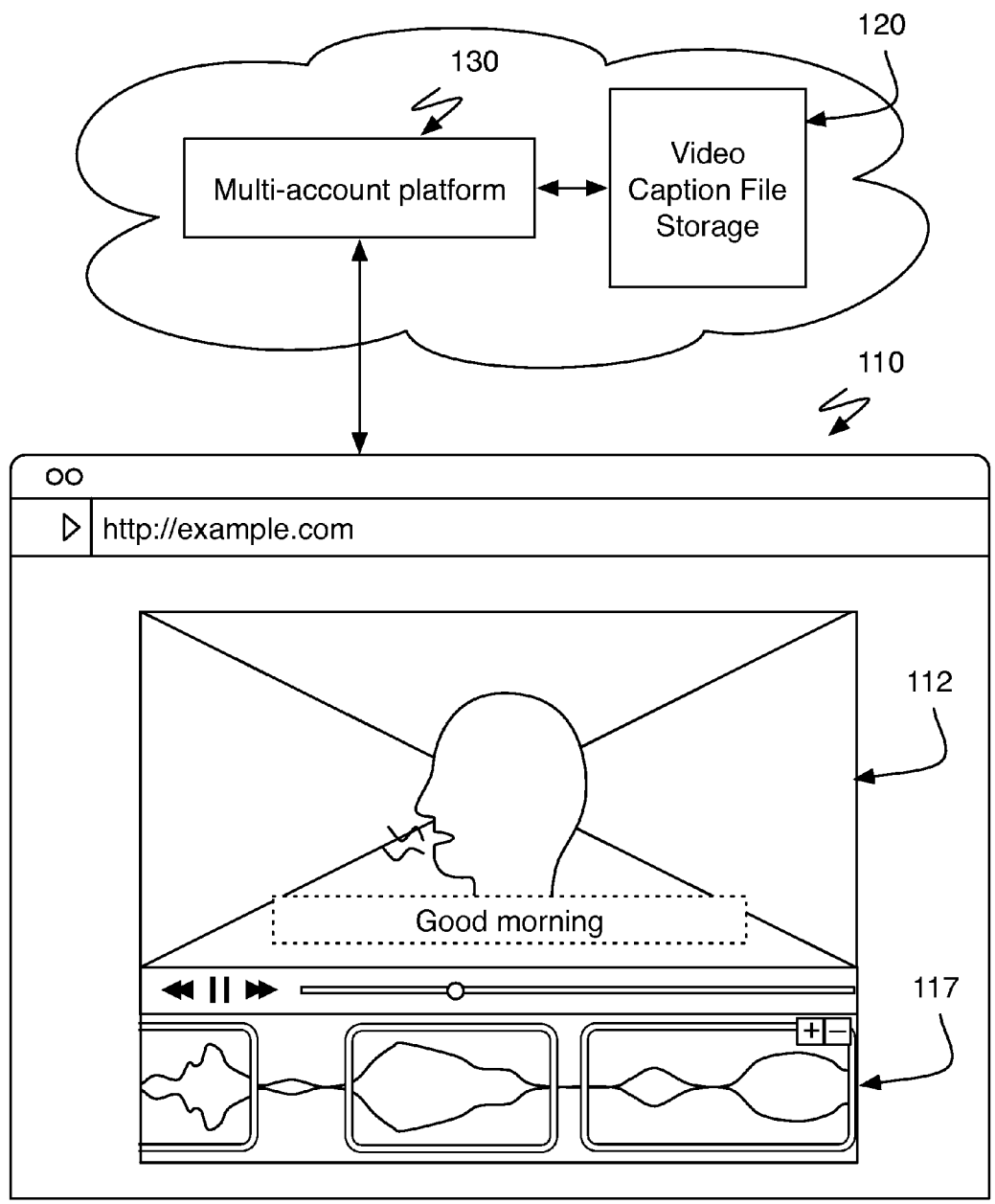
Figure 5:
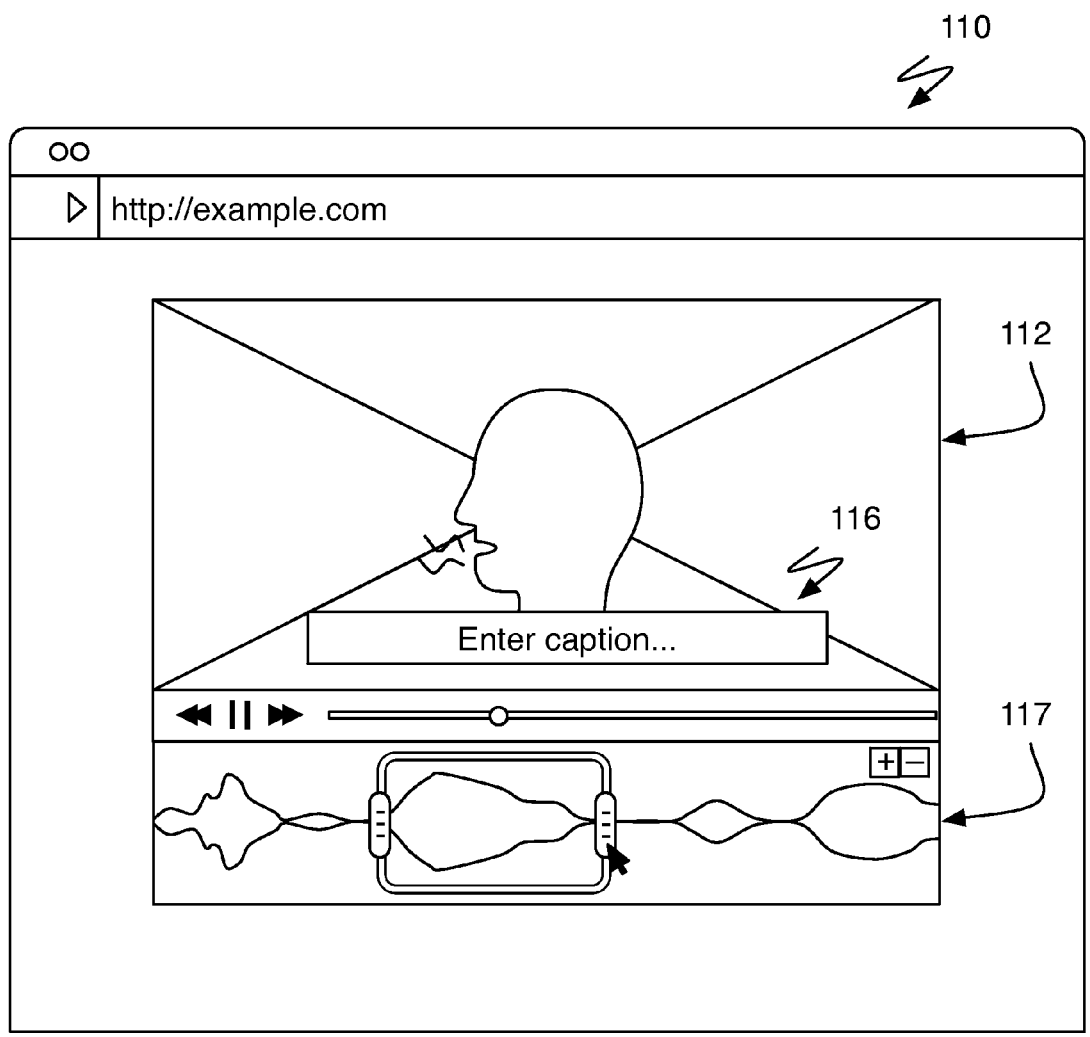

As shown in FIGS. 3-5, the system can additionally include an audio layer segmentation interface 117. The media player is preferably controllably coupled to the audio layer segmentation interface 117. This system functions to create an easy and efficient interface to caption a media file. Playback of the media in the media player 112 preferably plays in cooperation with the segmentation interface 117. Through user input, a portion of audio can be delineated for captioning in the segmentation interface 117, and captions added and previewed in the media player 112. The system preferably addresses the slow process of timing the display of captions in media, and the system allows the input of captions. Typically, the captioning will initially be performed in a native language, and a translation of the captions can later be added when subtitling media into a second language. The system is preferably configured for captioning of video including a visual and audio portion, but the system can alternatively be configured for any suitable form of media such as only audio, interactive media, and the like. The system can further include a multi-account online platform 130 enabling networked viewing and captioning of media. The online platform 130 is preferably a network accessible service accessible through a website or other suitable application. In one preferred embodiment, the system can be configured as a selectable mode of operation of a regular video player. When watching video, a viewer can be able to selectively activate the segmentation interface 117 and caption all or a portion of the media.

The audio layer segmentation interface 117 is a visual representation of an audio signal and an input interface for segmenting the media. The audio signal of the media is preferably visually represented as a waveform as a function of the media timeframe, displayed in a frame below the media player 112. However, the audio signal can be displayed at any other suitable position relative to the media player 112. The audio signal can alternatively be represented in any suitable form such as a binary representation of dialogue presence, two or more audio channels, a plurality of speaker channels, or any suitable representation. The visual representation of the audio signal allows for easy identification and selection of media segments for captioning. The audio layer segmentation interface 117 is configured to progress the audio signal representation horizontally across the frame of the audio layer. The audio signal representation is progressed in synchronization with the playback of the media in the media player, such that the audio layer representation in the segmentation interface 117 is a reflection of the audio at and around the playback position of the media. While video and audio playback in the media player 112 typically only depicts media representation at a single play position, the audio signal representation represents audio along at least a time dimension. The time view of audio is preferably centered on the current video playback position.

The audio layer segmentation interface 117 is additionally configured for receiving user segmentation input. Typically, user input allows for selection of a portion of the audio signal. The selection defines the time windowing of a media segment—the start and stop of a media segment is assigned by highlighting a portion of the audio waveform. Typically a user uses a mouse, touch input, keyboard controlled positioner, or other input device to initially mark a beginning or end time marker and then expand the highlighted media section to identify the full duration of a media segment. The segment interface element can include components configured for easy adjustment of the media segment delineation. Additionally or alternatively, segmenting and captioning of media can be performed through keyboard shortcuts in part or in whole. The input interface component of the audio layer segmentation interface 117 can alternatively include automatic or semi-automatic segmenting tools and can include any suitable alternative variation for delineating a segment of the audio layer. Previously segmented portions are preferably persistently represented appropriately in the progression of the audio signal representation of the captioned video.

In one preferred embodiment, the system includes a multi-account online platform 130, which functions to manage collaboration of multiple accounts with the media captioning. The platform 130 is preferably hosted on a distributed or cluster computing infrastructure. The platform 130 preferably communicates necessary instructions to render the interface no as a browser based web application, but can alternatively be configured for delivering instructions and data to render the interface no in a native application. The platform 130 preferably includes an account management system. An account profile on the account platform 130 preferably tracks language proficiency rating, caption input history, video viewing history, and any suitable aspects. The account management system can be used in enforcing changes and edits to captions.

2. Method for Collaborative Media Captioning

Figure 6:
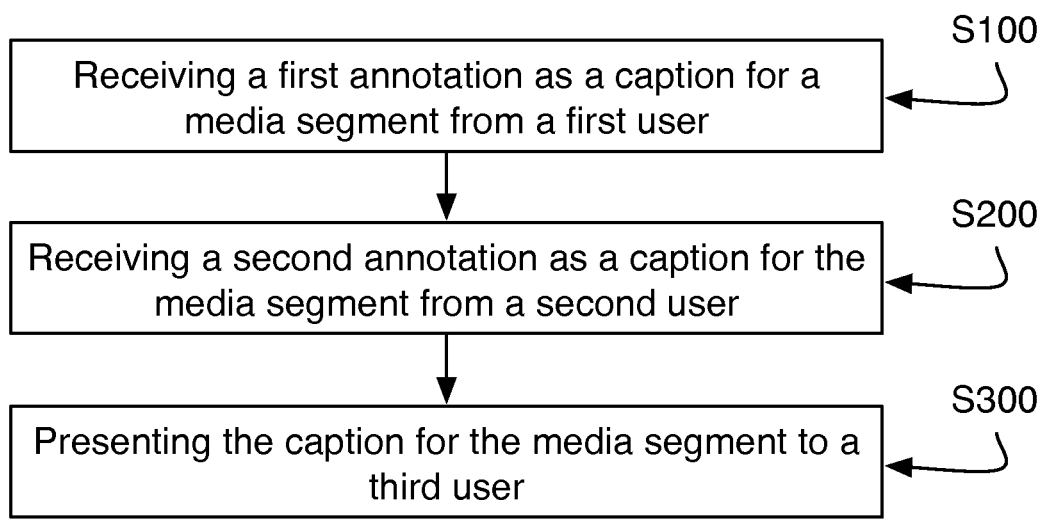
FIG. 6 is a flowchart representation of the method of captioning the media.
Figure 7:
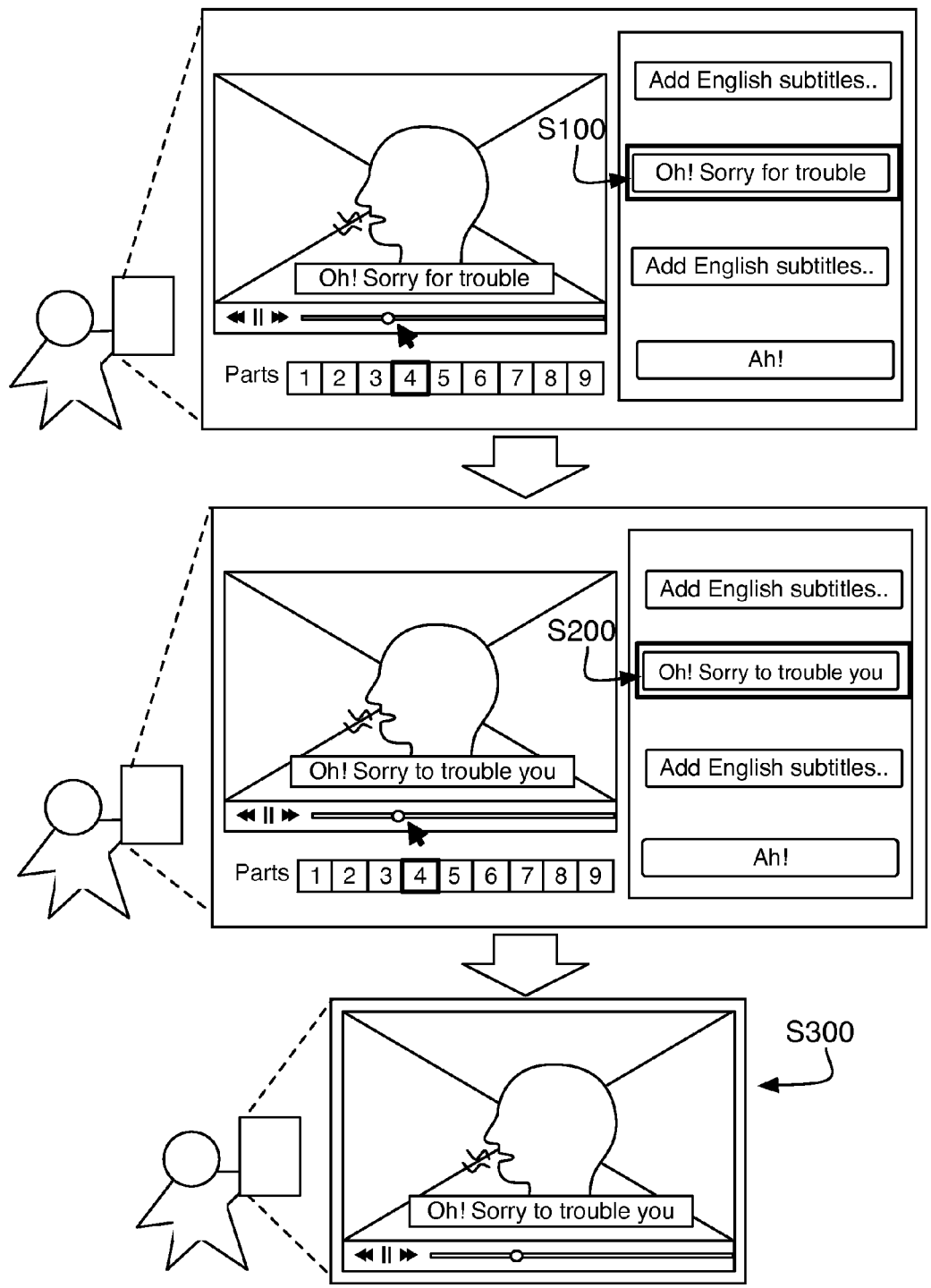
FIG. 7 is a schematic representation of an example of the method of captioning the media.
Figure 9:
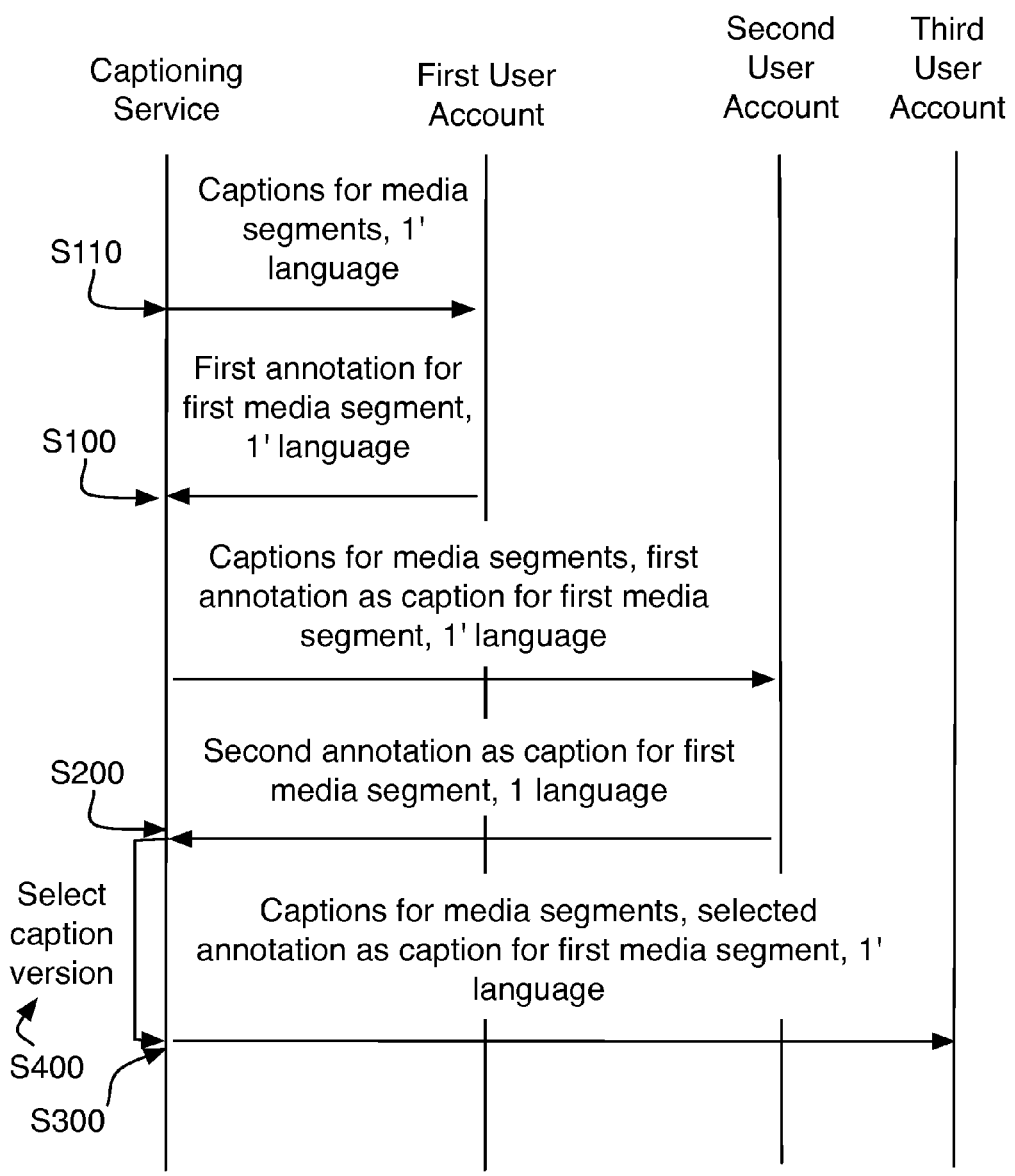
FIG. 9 is a schematic representation of a variation of the method.

As shown in FIGS. 6, 7, and 9, the method for collaboratively captioning media includes receiving a first annotation as a caption for a media segment from a first user S100, receiving a second annotation as the caption for the media segment from the second user S200, and presenting the caption for the media segment to a user S300. The first and second annotations are preferably in the same language, wherein the captions for the media segment are preferably captions in a first language for the media segment. The method can additionally include receiving segment parameters that define a media segment from a third user. The method enables the collaborative creation and refinement of captions. By crowd-sourcing the arduous task of media captioning (subtitling) and/or media sectioning, this method provides a way of rapidly generating captions for a consumer population. Moreover, the generated captions tend to be high-quality captions because users of the online captioning service can easily peer review and edit any errant captions.

Furthermore, when the first and second annotations are in a language different from the audio language, the method functions to not only crowd source media captioning, but also functions to rapidly translate the media into the second language. By translating the media quickly and reliably into the second language, this method enables the media provider (e.g., producer, media hosting service, etc.) to rapidly expand to other markets of users that consume content in the second language.

The method is preferably used for streaming media, wherein the captions are streamed alongside the video and audio to the user device. This allows for dynamic updating of the streamed captions as new captions and/or edits are added to the caption file. Therefore, instead of waiting for a new caption version from a caption publisher, this method allows media consumers to substantially instantaneously/concurrently receive updated caption versions (and gain the benefit of increased understanding or context) as they are consuming the content. Streaming media is preferably multimedia that is constantly received by and presented to the user while being delivered by the provider, such that the media can be played before the entire file has been transmitted. The media is preferably streamed using a multicast protocol, but can alternatively be streamed using any suitable protocol.

The method can additionally include receiving a first annotation in a second language as a caption for the media segment from a third user, wherein the second language is different from the first language. By crowd sourcing caption generation in multiple languages for the media, this method quickly and reliably provides multiple caption language options for a population of consumers.

The method is preferably implemented for captioning media on a website, but can alternatively be used in a native application or any other suitable interface. The method is preferably used for captioning streamed media, wherein the media is streamed to the captioning device from an online media provider. However, the method can be used for captioning stored media or used for captioning any other suitable form of media. The media is preferably video, such as movies, television shows, or animations, but can be used for any suitable media such as audio, presentations, screencasts, interactive media, and/or any suitable media. The media is preferably pre-recorded media, but can alternatively be live media (e.g., a live broadcast of an event). The method can be used for captioning the video into the same language as the media or, alternatively, for subtitling the media to at least a second language. The captioning is preferably performed for spoken words but can additionally be used for translation of text, description of sounds like sound effects and music, supplemental information, and/or any suitable use of captioning.

The media preferably includes a video file and an audio file that are synchronized along a media timeline. The video file preferably includes a plurality of video frames, but can alternatively include a plurality of key frames, wherein the media player on the device interpolates the frames between the key frames. The media can additionally include a caption file (e.g., for closed captioning) that is synchronized with the video and audio files along the media timeline. Prior to processing with this method, the media can have no captions, wherein the method generates captions for the media. Alternatively, the media can have at least one set of captions, and more preferably has multiple sets of captions (e.g., wherein each set of captions is in a different language). After this method has been performed on the media, the media is preferably associated with one or more sets of captions, wherein each set of captions is preferably of a different language. The multiple sets of captions can stored as separate caption files, can be stored as subsets of an overarching caption file, or can be stored in any other suitable manner. Each set of captions is preferably synchronized with the video and audio of the media, such that the caption appears on the video frames that are synchronized with the audio for which the caption is a transcription.

Each set of captions preferably includes multiple captions, wherein each caption is preferably associated with an annotation (the caption) and a start timestamp and an end timestamp within the caption file. Alternatively, each caption can be associated with a start timestamp and a display duration, can be associated with a start video frame and an end video frame, can be associated with a start audio signal and an end audio signal, or include any other suitable caption data structure. The timestamps and/or duration preferably define the media segment/section for which the caption is intended. Each caption can additionally include multiple versions, wherein each version is preferably received at a different time (e.g., real-time, not timestamp), or received from a different user. Each caption version preferably includes metadata including a user identifier identifying the user that submitted the version of the caption, the time at which the version was submitted, a device identifier, a geographical location identifier (e.g., of the user location at the time of version submit) or any other suitable metadata.

The media segment is preferably the portion of the video or audio file between start and end timestamps. The media is preferably segmented into media segments by users of the system, but can alternatively be automatically segmented into segments by the system, as described below. The media segments preferably do not overlap along the media timeline, but can alternatively overlap.

In operation, the caption is preferably shown (e.g., overlaid) on the video frames between the start timestamp and the end timestamp, or on the video frames during the duration starting from the first timestamp. Alternatively, the captions can be hard-coded into the video frames of the video file. The captions within a caption set preferably do not have overlapping durations (e.g., are sequential), but can alternatively have overlapping durations, as in the case of different captions for different speakers. Alternatively, the captions can be used as a script or source for dubbing or lectoring (e.g., voice-overs of) the media. The dubbing or lectoring can be automatically generated, such as through machine text-to-voice methods, or can be manually generated, wherein a user (preferably different from the first and second users but alternatively any suitable user) uses the captions as a script to dub or lector a media segment or any other suitable portion of the media.

The media is preferably stored in a media repository (e.g., a server), but can alternatively be stored in any other suitable storage means. The media is preferably streamed to the device supporting the browser or native application, but can alternatively be stored on the device. The method is preferably implemented in a multi-account collaborative system by a captioning networking service, media hosting service, or any other suitable media or caption provider. The media is preferably stored by and streamed from an online captioning service to receiving devices, wherein the captioning service preferably further generates caption files for the streamed media.

Alternatively, the media can be stored by and streamed from an online media hosting service separate from the captioning service (e.g., YouTube), wherein the captioning service provides the interface to caption the streamed media, and generates the caption files. The online captioning service and/or media hosting service preferably includes a plurality of online user accounts, wherein each of the online user accounts is preferably associated with a user profile and a content stream of user-generated posts (e.g., electronic messages). The user profile can be user-generated, or can be automatically derived from the user account content stream, from the connections of the user account, from the user device, or from any other suitable information associated with the user account. The online captioning service and/or media hosting service preferably streams information (e.g., video, audio, or caption information) to the receiving device through the Internet, but can alternatively stream or send information in bulk (e.g., send the entire file prior to media play) to the receiving device through near-field technology or any other suitable data transfer scheme. Likewise, the online captioning service and/or media hosting service preferably receive data from the user device through the Internet. The data (e.g., annotations for captions) is preferably received piece-wise, each time data is received for a media segment, but can alternatively be received in bulk (e.g., annotations for an entire piece of media).

In one variation of the method, the captioning service provides a user interface (e.g., browser window) that streams the media from a separate media hosting service, wherein the captioning service receives and processes the media segmenting and captioning data into a caption file. The resultant caption file(s) can then be sent to the media hosting service for synchronization and/or subsequent streaming with the original media, or can be stored at the captioning service servers, wherein a user request to view the media can prompt the captioning service to stream the captions to the user.

The media is preferably playable on a player interface on the user device, which functions to provide an interface for media viewing, listening, and/or experiencing. The player interface is preferably substantially similar to the one described in the system above, but the player interface can be any suitable interface for consuming media. The player interface preferably enables media segment selection and annotation entry, and can additionally provide interfaces for other suitable media tools, such as pause/play, fast forwarding, rewinding, skipping forward or backwards to other chapters, changing volume settings, and/or adjusting other media playback parameters.

The media is preferably further playable on a media player, wherein the player interface can include a media player. The media player preferably provides interfaces for pause/play, fast forwarding, rewinding, playing at a multiple of the typical play speed, skipping forward or backward along the media timeline, changing volume settings, and/or adjusting other media playback parameters. The media player preferably additionally enables closed captioning selection, wherein the captions can be selectively turned on or off dependent upon closed captioning icon selection. While the caption file is preferably streamed or otherwise provided with the rest of the media independent of the closed captioning icon selection state, the caption file can be selectively streamed based on the closed captioning icon selection state (e.g., streamed when the closed captioning icon is on, not streamed when the closed captioning icon is off).

The language of the captions and/or audio is preferably natural human language or a specific linguistic system. In other words, the language is preferably a formal system of signs governed by grammatical rules of combination to communicate meaning. However, the language can be any other suitable form of communication. The language can be written language or spoken language. The language is preferably a language in common use (e.g., not a dead language), but can alternatively be an extinct language, a proto-language, or any other suitable language. Examples of languages include Japanese, Chinese, English, German, Russian, French, and Spanish. The languages are preferably related by family trees, wherein languages within the family tree share common traits, such as words, word structure, word pronunciation, written script, grammatical structure, or any other suitable trait. For example, English is related to German as part of the Germanic language family. Japanese can be considered related to Chinese due to its extensive use of Chinese characters. In operation, captions in a first language can be used to generate captions in a related language (e.g., by written or spoken relation).

Each language can be associated with a commonality ranking within the system, wherein the commonality ranking can be indicative of (e.g., correlate with) the popularity or prevalence of the language. For example, English can have a high ranking within the system, while Cherokee can have a low ranking. This commonality ranking can be determined based on the languages associated with user accounts (e.g., listed within the user profile or wherein the user account selects a given language for subtitles), wherein languages having a higher occurrence rate are given higher commonality rankings. Each language can additionally have an association ranking with respect to a second language, wherein the association ranking can be indicative of the number of users that have expertise in the first and second languages (e.g., speak, read, write both the first and second languages at a novice, intermediate, or fluent level). For example, if more users of the system are fluent in both Japanese and English than are fluent in both Japanese and Russian, the association ranking for the Japanese-English combination is preferably higher than the Japanese-Russian combination. However, each language or group of languages can be given any other suitable ranking based on any other suitable parameter.

Receiving a first annotation as a caption for a media segment from a first user S100 functions to create or edit a caption for the media segment. The first annotation is preferably received from a first device associated with the first user, but can alternatively/additionally be received from a first user account associated with the first device or user, or received from any other suitable structure that substantially uniquely maps to the first user. The first annotation is preferably entered into a caption input field by the first user, but can alternatively be a recommended annotation (e.g., automatically generated using voice to text methods or extracted from a script) that is selected by the user. The first annotation is preferably text, but can alternatively be an icon selection, link, or any other suitable annotation. Annotations for a media segment are preferably received independent of annotations for other media segments, but can alternatively be received with annotations for other media segments.

The first annotation is preferably in a first language, wherein the caption (e.g., caption set) is preferably a caption in the first language for the media segment. The first language can be the audio language or can be a language different from the audio language. Receiving the first annotation can additionally include selecting the language of the first annotation. Selecting the language of the annotation preferably includes receiving a language selection from the user, user device, or user account prior to first annotation receipt. The language selection can be a selection of an icon associated with the language, a selection of the language from a drop-down list, or any other suitable language selection. Alternatively, the language of the annotation can be determined from the user profile associated with the user, wherein the language of the annotation is preferably selected from a list of languages associated with the user account.

Alternatively, the language of the first annotation can be automatically determined through text or language recognition methods.

Receiving a first annotation as the caption for the media segment from the first user preferably includes streaming the video, audio, and any captions to the first device prior to receiving the first annotation S110. The video, audio, and captions can be limited to the video, audio, and captions for the media segment, or can be the video, audio, and captions for all or a larger portion of the media. The streamed captions are preferably the captions in the first language (captioning language for the user) for the media, but can alternatively be captions in a second language different from the captioning language, such as when the user is translating the second language to the captioning language.

Receiving the first annotation from the first user preferably additionally includes presenting caption input fields for the media segment to the first user. More preferably, caption input fields are rendered at the first device. The annotation for a media segment is preferably received in association with a video frame within the media segment. More preferably, a video frame of the media segment is preferably displayed during annotation entry/receipt. The first annotation is preferably received at a caption input field (e.g., text input field or annotation input field) that is shown alongside or otherwise associated with a video clip, audio, or image representative of the media segment to be annotated (subtitled). The media segment and caption input field can be shown as one of a plurality of media segments, or can be shown independent of the other media segments and caption input fields of the full media file. Caption input fields are preferably presented for each media segment, wherein each media segment is associated with a different caption input field. The caption input field for a media segment is preferably presented in conjunction (e.g., beside, surrounded by a common frame, etc.) with the current version of the caption for the media segment. The caption input field is preferably a transparent layer superimposed on top of the media player, but can alternatively be semi-opaque, be superimposed over the video portion of the media player, superimposed over a section of the video portion, or have any other suitable property. The position of the caption input field is preferably fixed in relation to the media player, but can alternatively be adjustable, wherein the caption is preferably displayed at the adjusted position of the caption input field. The adjusted positions can be limited (e.g., to the top, bottom, and sides of the media player) or unlimited. When the caption input field is mobile, the user-determined location of the caption input field is preferably also recorded within the caption file. Alternatively, the caption input field can be arranged beside the media player, or positioned in any other suitable relation. A separate caption input field is preferably rendered for each media segment. Caption input fields can be rendered as a part of the caption stream, wherein the plurality of caption input fields scroll within a frame of the caption stream. Progressing caption input field of a caption stream preferably includes scrolling the caption stream such that caption input field that correspond to the current play positions of the media file are shown and optionally highlighted in frame of the caption stream interface. The caption input field preferably displays the received input of a media segment only for the timeframe of the defined media segment when the media is played. The media can play behind the caption input field, enabling a preview of the media segment. The caption input field preferably functions substantially similar to a text input field.

Figure 16:
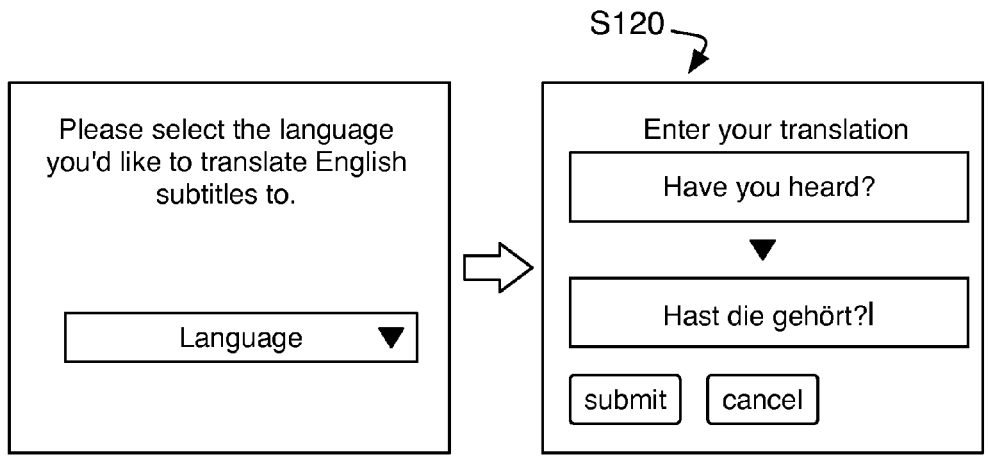
FIG. 16 is an example of receiving a first annotation independent from the audio and video of the media segment.

The first annotation can alternatively be received independent of the media segment S120, wherein the first annotation is received at a caption input field that is disassociated from the video or audio of the media segment, an example of which is shown in FIG. 16. The first annotation is received in association with a caption that is associated with a media segment of interest. The first annotation received at the caption input field is then saved as a variation of the caption for the media segment or saved as the caption for the media segment. After a first annotation has been received for the first caption, the system preferably presents a second caption for annotation, wherein the second caption is associated with a second media segment. The second media segment can be the media segment adjacent (e.g., succeeding) the first media segment in the media file, or can be a media segment from a different media file. The second media segment can be randomly selected, selected based upon the temporal relationship with the first media segment, or selected in any other suitable manner. This variation of the method can expedite subtitling and translation by simply presenting the captions of the media segments without presenting the media segment audio or video.

The media segment with which the caption and first annotation are associated is preferably randomly selected, but can alternatively be selected based on the number of stored caption versions in the first annotation language for the media segment, the quality of the caption versions in the first annotation language for the media segment (e.g., automatically determined or user-ranked, wherein media segments lacking caption versions having a rank over a predetermined threshold are selected), or selected in any other suitable manner.

The first annotation received at the caption input field can be a translation of the caption (e.g., in a second language, different from the caption language). For example, the caption can be an English caption, while the first annotation can be in Chinese. Alternatively, the first annotation can be an edit of the caption (e.g., in the same language as the caption language), wherein a secondary caption in a second language and associated with the same media segment is preferably also presented. For example, the caption and the first annotation can be in Chinese while the secondary caption can be in English. Whether the first annotation is a translation of the caption or an edit of the caption can be automatically detected by the system using language detection or identification algorithms, or can be selected by the user (e.g., from a language dropdown menu). The caption language is preferably a common language (e.g., English), but can alternatively be any suitable language. The caption language is preferably automatically determined by the system, but can alternatively be selected by the user. In the latter variation of the method, the system preferably selects and presents captions of the user-selected caption language from the database. For example, when the user selects "Spanish" as the caption language to be translated, the system preferably selects Spanish captions to present to the user for translation.

The caption is preferably presented entirely independently from any identifiers of the media segment. Alternatively, a link, thumbnail, GIF, or other media segment identifier can be presented with the caption. The caption to be edited or translated for a single media segment can be presented alone or be presented with the captions of one or more media segments that are adjacent the media segment of interest (e.g., the media segment associated with the caption to be edited or translated). The caption associated with the media segment (e.g., a caption previously received or generated for the media segment) is rendered at a device of the first user in association with a caption input field. The selected and rendered caption for the media segment is preferably the caption having the highest ranking or score (e.g. in a similar manner to determining the first and second annotation scores), but can alternatively be a randomly selected caption in the selected caption language for the media segment, or be selected in any other suitable manner.

The method preferably includes receiving a selection of the media segment from the first user prior to receiving a first annotation from the first user. Receiving the selection of the media segment preferably places focus on the caption input field for the media segment, such that the user can enter an annotation for the media segment. The media segment selection can be received as a cursor input, keystroke, touch, or any other suitable input. Receiving a selection of the media segment can include receiving a selection of an icon associated with a timestamp, wherein the timestamp is within a media segment time period that is bounded by a start and end timestamp. The icon can be portion of a rendered media timeline, a framed field surrounding the caption input field, the caption input field, the rendered caption, a section of a visual representation of the media audio, or any other suitable icon.

Receiving the first annotation from the first user can additionally include receiving typesetting parameters for the first annotation. Typesetting parameters can include caption placement (e.g., on the video), caption font, caption style (e.g., italicized, bold, etc.), caption color, or any other suitable typesetting parameter. The typesetting parameters are preferably isolated to the first annotation, but can alternatively be propagated to other versions of the caption in the first language for the given media segment, propagated to captions in the first language for other media segments, propagated to captions in other languages for the given media segment, or otherwise propagated throughout the media.

Receiving a second annotation as the caption for the media segment from the second user S200 functions to receive a second variation of the caption for the media segment. The second user is preferably a different user than the first user, and is preferably associated with a second user account and a second device, both of which are preferably different from the first user account and first device, respectively. The second annotation is preferably in the first language. The second annotation is preferably received for the same media segment as the first annotation, and is preferably stored as a version of the caption in the first language for the media segment. Alternatively, the second annotation can be stored as the caption in the first language for the media segment, wherein the second annotation overwrites the first annotation. The second annotation can be an edit of the first annotation, wherein the first annotation is preferably presented to the second user prior to second annotation receipt. The first annotation is preferably presented to the second user as the caption of the first language for the media segment. The current version of the caption of the first language for the media segment is preferably presented to the second user in a manner similar to presentation of the caption for the media segment to the third user as described below, but can alternatively be otherwise presented. The second annotation can alternatively be an annotation separate from the first annotation or any other suitable annotation. Similar to the first annotation, the second annotation is preferably text, but can alternatively be an icon selection, link, or any other suitable annotation. Similar to receiving the first annotation, receiving the second annotation can additionally include determining the language of the second annotation. The language of the second annotation can be determined as described for the first annotation, or can be otherwise determined. Typesetting parameters can be received for the second annotation, or the typesetting parameters for the first annotation can be propagated to the second annotation. Alternatively, the second annotation can be an edit in the typesetting parameters of the first annotation.

Receiving a second annotation as the caption for the media segment from the second user can include streaming the video, audio, and the first annotation as the caption for the media segment to the second device prior to receiving the second annotation, in a manner similar to streaming the media to the first user as described above. Receiving a second annotation as the caption for the media segment from the second user can additionally include presenting caption input fields for the media segment to the second user, in a manner similar to presenting the caption input fields to the first user as described above. Receiving a second annotation as the caption for the media segment from the second user can additionally include receiving a selection of the media segment from the second user prior to receiving a second annotation from the second user, in a manner similar to presenting the caption input fields to the first user as described above.

Receiving a second annotation as the caption for the media segment can alternatively include selecting a media segment, rendering the first annotation for the selected media segment in association with a caption input field independent of the audio and/or video of the selected media segment S210 (as shown in FIG. 17), receiving the second annotation in the caption input field S220, and associating the second annotation with the selected media segment. Receiving a second annotation as the caption for the media segment independently of the audio and video of the media segment is preferably substantially similar to receiving the first annotation as the caption for the media segment independently of the audio and video of the media segment, as described above, but can alternatively be substantially different. Receiving a second annotation as the caption for the media segment can additionally include selecting the second annotation language, wherein the second annotation is saved or associated with the selected media segment as a caption in the selected language. Receiving a second annotation as the caption for the media segment can additionally include selecting a language of the first annotation, wherein annotations of the selected language are preferably presented as the first annotation.

Selecting the media segment preferably includes selecting a media segment lacking captions in the second annotation language, but can alternatively include selecting a media segment lacking captions in the second annotation language having ranking or scores above a predetermined threshold, selecting a media segment having a number of captions in the second annotation language below a predetermined threshold, randomly selecting a media segment, or selecting the media segment in any other suitable manner.

Rendering the first annotation for the selected media segment in association with a caption input field independent of the audio and/or video of the selected media segment S210 preferably includes rendering only the first annotation and receiving the second annotation in a caption input field separate from the first annotation, wherein the first annotation is preferably of a different language than the second annotation. Alternatively, rendering the first annotation can include rendering a caption outside of the caption input field, rendering the first annotation in the caption input field, and receiving the second annotation as an edit of the first annotation, wherein the caption is in a first language and the first and second annotation are in a second language. The caption language can be determined by a selection received from the user, or can be automatically selected by the system. Rendering the first annotation can additionally include selecting a first annotation to render. When multiple versions of first annotations or captions for the media segment exist (e.g., different entries or different edited versions of the first annotation), the first annotation version presented to the second user can be randomly selected, be the version with the highest ranking, the version with the lowest ranking, or be any version selected in any other suitable manner. Annotation versions having a score or ranking below a predetermined threshold can be withdrawn from a queue of potential annotations to be presented to the second user for annotation or ranking. However, the first annotation to be rendered to the user can be selected in any other suitable manner.

Figure 17A:
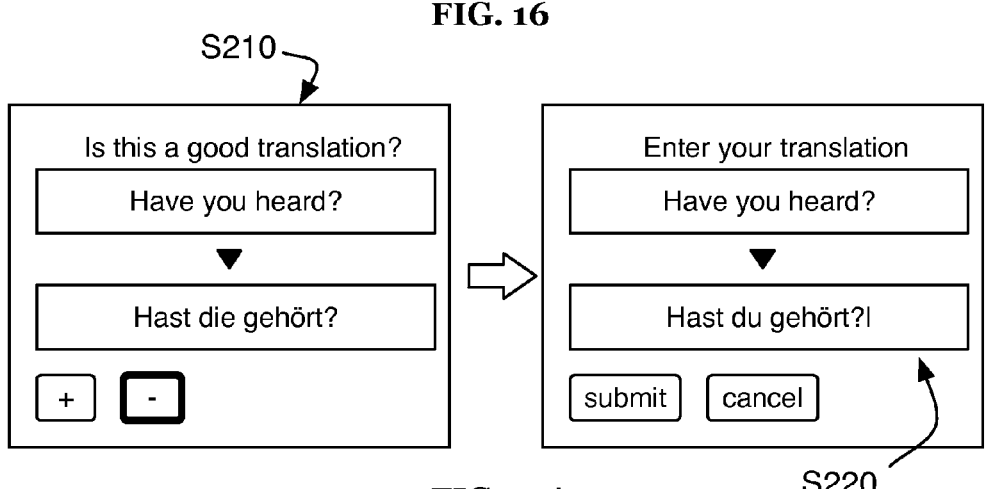
FIGS. 17A and 17B are a first and second example of receiving a second annotation independent from the audio and video of the media segment.
Figure 17B:
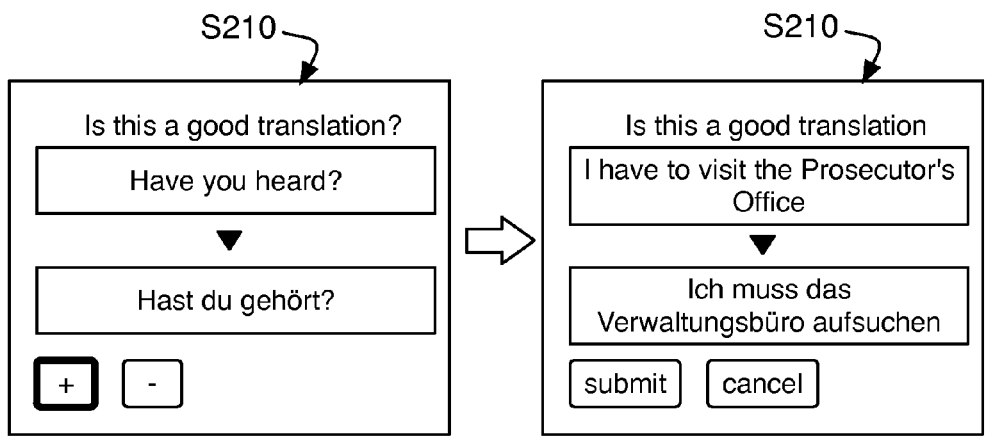

Receiving the second annotation S220 preferably includes receiving a text input at the caption input field. The second annotation can be a new entry, or can be an edit of a pre-existing entry (e.g., an edit of the first annotation). The second annotation is preferably saved as a version of the caption in the second annotation language for the media segment, but can alternatively be saved as the only caption in the second annotation language for the media segment. Receiving the second annotation can additionally or alternatively include receiving a quality indicator for the first annotation, such as a positive or negative ranking, which increases or decreases the score or ranking of the first annotation, respectively. In one example of the method wherein the first annotation is rendered in the caption input field, the ranking or score of the first annotation is preferably increased when the user progresses to the next caption for the next selected media segment without editing the first annotation, and the ranking or score of the first annotation is preferably decreased when the user edits the first annotation. In response to the receipt of a negative quality indicator, the system can prompt the user to enter a second annotation (e.g., text translation) for the caption, as shown in FIG. 17A. In response to the receipt of a positive quality indicator, the system can render a second caption for a second media segment, wherein the second media segment can be randomly selected or selected based on a temporal relationship with the first media segment in the media file, as shown in FIG. 17B.

Presenting the caption for the media segment to a user S300 functions to display the current version of the caption for the media segment to a user. The user is preferably a third user, but can alternatively be any other suitable user. The third user is preferably a different user than the first and second users, and is preferably associated with a third user account and a third device, both of which are preferably different from the first and second user accounts and first and second devices, respectively. However, the user can be the first user or the second user, particularly during annotation input or editing. The media segment is preferably the media segment for which the first and second annotation was received. Presenting the caption for the media segment to a user preferably includes rendering the caption in the first language for the media segment, wherein the caption is preferably rendered at the user device, but can be otherwise presented to the user. The caption can be rendered over the video between the start timestamp and the end timestamp during media play. Alternatively, the caption can be rendered on a portion of the player interface beside the video (e.g., in a caption stream), wherein the caption can persist after the corresponding media segment has finished playing. The captions are preferably displayed in real time preview, and preferably appear as the annotations are received from the user. In a multi-account implementation of the method, the caption can be supplemented with caption history that tracks edits, editors, and any other changes to a caption. Furthermore, the caption input component can provide a discussion thread for the caption, a caption rating component (e.g., thumbs up/down, star rating), a caption classifying component (e.g., flagging bad translations, flagging grammar errors, etc.).

Captions for various media segments are preferably progressed in synchronization with the played media, which functions to display relevant caption input as a media file plays. Progressing the captions in synchronization with the played media can include updating play position of media. The play position of the media can be updated according to the caption stream, according to a user selection of a timestamp on the media timeline, according to a user selection of a media segment, or according to any other suitable media parameter associated with play position. User navigation of the caption stream can alter the play position of the media. For example, if the user scrolls ahead in the caption stream and clicks on a caption that is associated with a video segment one minute ahead of the current play position, the media player will skip the media ahead one minute. Similarly, when editing or interacting with a caption, the associated portion of media can play, pause, or alternatively loop the media segment associated with the caption. Automatically playing the media segment can aide in captioning or translation of the media. In one variation, keyboard shortcuts can be used to facilitate navigation of the caption stream. The media player and the caption stream are preferably synchronized regardless of form of navigation keyboard input, mouse/cursor input, touch input, and the like. The caption stream can alternatively be desynchronized with the media through user intervention. For example, a user can scroll the caption stream to browse captions independent from the media play.

Media segment caption presentation can additionally include rendering captions according to a caption rating. The rating can be a confidence level, a categorization of caption (e.g., automatic translation, caption from source material, third degree translation), rating based on authorship, or any suitable rating. The caption rating will typically characterize at least a caption in need of more attention and a caption that does not need more attention. By enabling captions to be roughly generated either through entities with sometimes poor performance (algorithmic tools or by un-validated community members), more media content can be subtitled into more languages. While media content can be quickly made accessible, the content can be continually improved through caption edits of the community. Preferably, rendering captions according to a caption rating includes formatting text according to a caption rating key. The text color, positioning, styling and any suitable aspect can be used to indicate the caption rating. When watching the media, if the viewer notices a caption is indicated to have a low caption rating, then that viewer can enable the caption stream interface and help improve the caption. By indicating the caption rating, experienced users can also better prioritize the captions that need edits. In one exemplary embodiment, captions from an automatic captioning system can be rendered in a red font color to indicate machine subtitling and low confidence; captions contributed from a new user can be rendered in a grey font color to indicate human captioning and low confidence; captions contributed or edited by an account user with a high captioning score can be rendered in a white font to indicate high confidence; and captions that have received positive ratings can be rendered in a white font to indicate high confidence.

Figure 8:
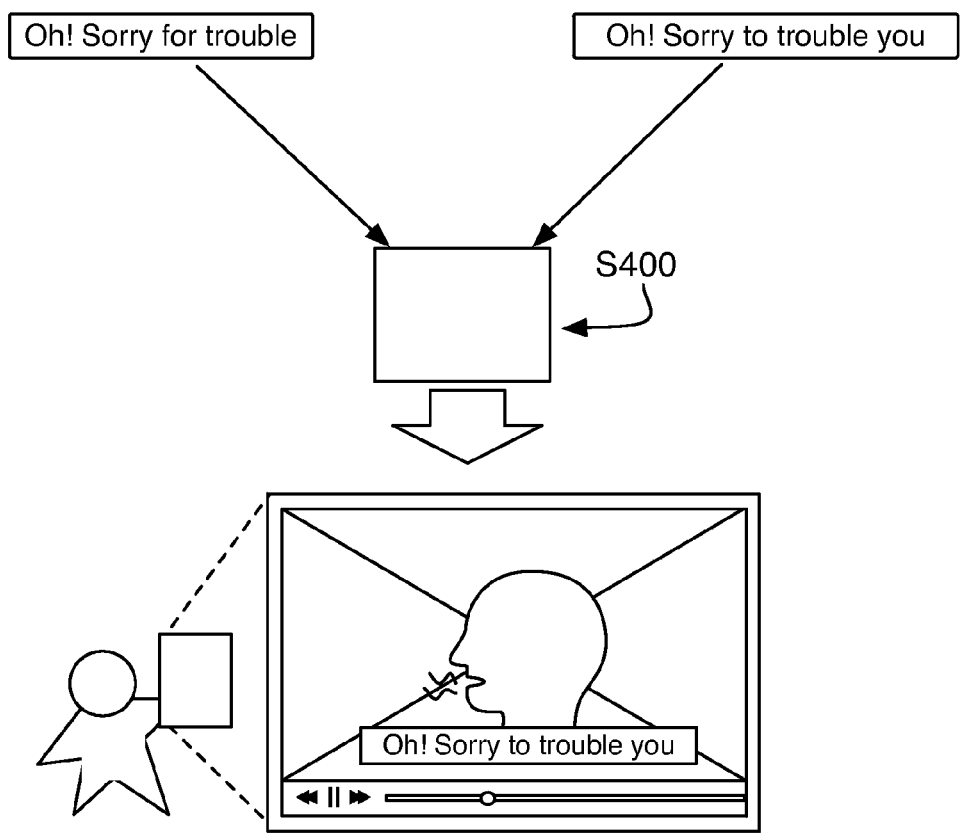
FIG. 8 is a schematic representation of an example of processing the annotations to select a caption for the first media segment.

The method can additionally include performing an analysis on the first and second annotations to select the first or second annotation as the caption in the first language for the media segment S400, as shown in FIGS. 8 and 9. The selected version/annotation is preferably presented to the third user as the current version of the caption in the first language for the media segment. S400 can include automatically selecting an annotation to be the presented caption version, or selecting an annotation based on inputs from the community of user accounts. Automatically selecting an annotation can include comparing the first and second annotations to an automatic machine translation (e.g., voice to text translation) of the audio of the media segment, and selecting the annotation most similar to the machine translation, selecting annotations having a similarity to the machine translation beyond a predetermined threshold (e.g., over 50% similar) or removing annotations having a difference from the machine translation beyond a predetermined threshold (e.g., below 40% similarity, above 70% difference, etc.). Similarity can be determined by phrase convergence or divergence, similarity of words (e.g., keywords), similarity of grammar, or similarity of any other suitable language parameter. Automatically selecting an annotation to be the presented caption version can alternatively include comparing each annotation to known rules for the first language (e.g., determined empirically or set by a user), wherein the annotations that satisfy the rules within a given threshold can be selected as the presented caption version. Automatically selecting an annotation to be the presented caption version can alternatively include selecting the most commonly occurring annotation version. Automatically selecting an annotation to be the presented caption version can alternatively include determining the most commonly occurring components amongst the multiple annotations and generating a new annotation from the commonly occurring components. For example, if multiple annotations include a given set of keywords (e.g., over a threshold occurrence rate) and multiple annotations include a given grammatical structure (again, over a threshold occurrence rate), then the system can order the keyword set using the grammatical structure to generate the new annotation. Alternatively, S400 can compare the annotations and select the annotation that is the most recently received. Alternatively, S400 can compare the annotations and select the annotation that is submitted by the highest ranked user account. Alternatively, S400 can compare the annotations and select the highest ranked annotation in the first language for the media segment. In this variation, the system can iteratively present the annotations to each successive user requesting the captions (e.g., the first annotation to the first viewer, the second annotation to the second viewer, etc.), receive an annotation quality indicator for the annotation from the user (e.g., good/bad, upvote/downvote, ranking along a continuum between 1-10, etc.), rank the annotation or calculate a rank for the annotation based on the received annotation quality indicator(s), and select the annotation having the highest ranking as the caption in the first language for the media segment. Alternatively, the annotations having a rank or score (e.g., number of positive inputs) beyond a predetermined threshold can be selected and presented, wherein multiple annotations having a rank/score beyond the predetermined threshold can be iteratively or randomly selected and presented. The annotations can be iteratively presented for a predetermined period of time, iteratively presented for a given number of presentations for each annotation (e.g., each caption version is displayed 10 times), or iteratively presented until a suitable stop condition is met. The annotations can be iteratively presented after the annotation for the caption has been selected, wherein the annotations are iteratively presented after an iterate condition is met. The iterate condition can be the receipt of a new annotation, the satisfaction of a given period of time, the satisfaction of a number of user requests for the captions beyond a predetermined threshold, or any other suitable condition. Alternatively, caption authorship, caption edits, flagging, ratings (e.g., thumbs up/down, star ratings etc.), caption comments, and/or any alternative forms of caption feedback can be used to enable at least two accounts to collaboratively improve a caption. Collaborative edits can additionally be contributed according to account priority. Accounts can be granted and/or earn language proficiency, seniority, priority, authority, permissions, and/or other administrative controls. Edits, comments, and captioning can be committed according to the account issuing the action. For example, a new user can be prevented from editing a caption contributed by a high priority account (e.g., an account that has made numerous high rated translations). The edit of the new user can be issued as a message/alert or ignored completely. A high priority account can be allowed to edit any caption of a lower priority account. However, the annotation for the caption in the first language for the media segment can be selected using a combination of the aforementioned versions, or can be otherwise selected.

In one variation of the method, processing the annotations to select a caption variation to be presented as the caption for the media segment for the given language can additionally include sending a notification to the user account that generated the selected annotation, sending a notification to the user account that generated the previously selected annotation, or sending a notification to any other suitable user. For example, a notification can be sent to the user accounts (e.g., friends, followers, etc.) connected to the user account of the selected annotation.

The method can additionally include rating the language proficiency of an account, which functions to measure language skills of community members and contributors of translations. The language proficiency rating of an account holder can be used in enforcing caption edits, measuring translation scores, displaying captions, displaying reference captions, and any suitable aspect of contributing to or consuming captioned media. In a first variation, language proficiency can be at least in part rated based on contributions to captions. The rating can be any suitable algorithm, but can include parameters such as number of contributed captions, number of corrections others have made to contributed captions, number of corrections made to captions contributed by other accounts, language of used reference captions, ratings of captions, media views with contributed captions, and/or any suitable aspect of caption contribution. In a second variation, language proficiency can be at least in part rated based on consumption of media. In one preferred variation, the method is implemented by a video streaming service, and as such, the method can include monitoring media consumption in rating language proficiency. The number/length of media consumed and the native language and/or caption languages consumed can factor in to the language proficiency. Additionally, aspects of language proficiency can be rated based on user self assessments, verified test scores, language tests, or any suitable means of measuring language proficiency.

Figure 10:
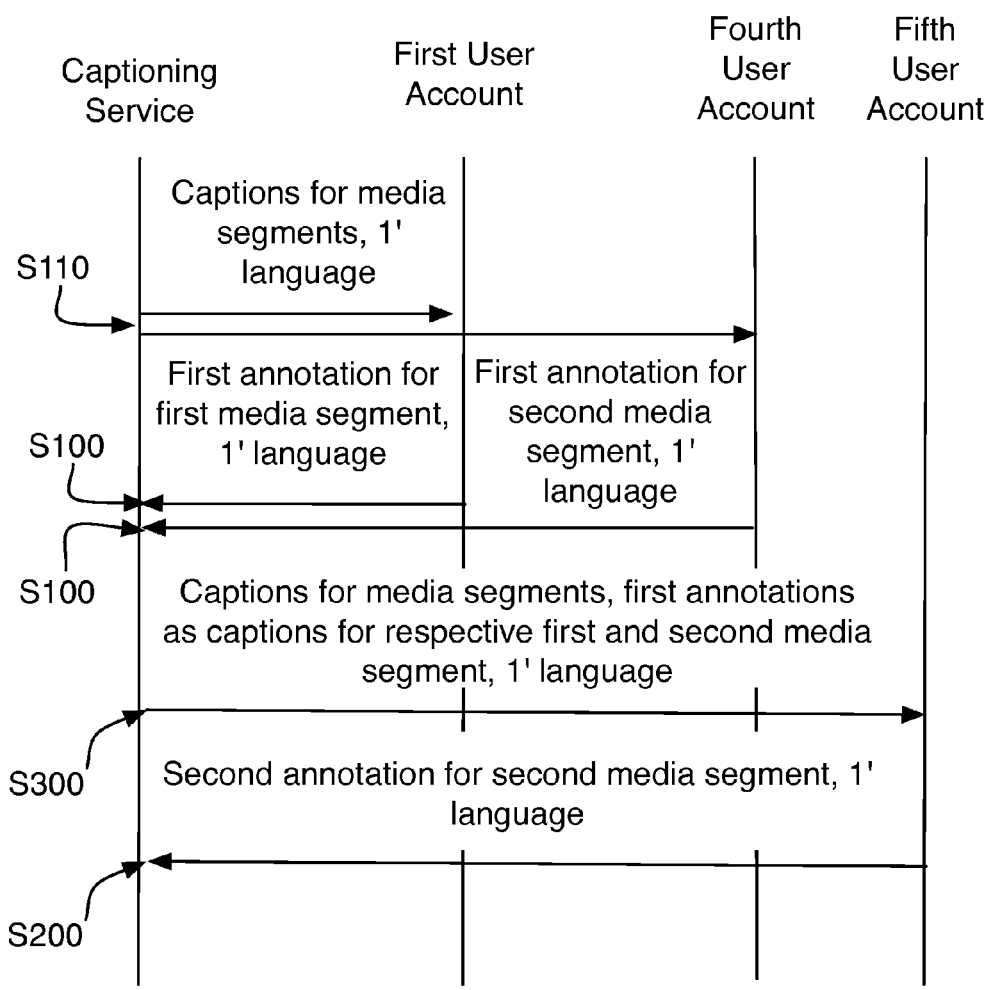
FIG. 10 is a schematic representation of a variation of the method, including collaborative editing of multiple media segments by multiple users.

The method can additionally include collaborative editing of multiple media segments by different users, as shown in FIG. 10. This enables the captions to be generated faster than having a single user sequentially captioning each media segment. Collaborative editing of multiple media segments by different users preferably includes receiving a caption in the first language for a second media segment from a fourth user. Alternatively, collaborative editing of multiple media segments can include receiving a caption in a second language for a second media segment from the fourth user, wherein the second language is preferably a different language from the first language. The second media segment is preferably a media segment with a different start and/or end timestamp from that of the first media segment, but can alternatively be the same media segment. The fourth user is preferably a different user from the first and second users, but can alternatively be any suitable user. Annotations for the first and the second media segments are preferably substantially concurrently received (e.g., the annotation for the second media segment is received substantially concurrently with receipt of the annotation for the first media segment), but can alternatively be received at different times. The annotation for the caption in the first language for the second media segment is preferably added to the file including the caption in the first language for the first media segment, but can be otherwise stored. The caption in the first language for the second media segment is preferably additionally editable in the manner described above (S200) by a different user from the fourth user. Furthermore, accounts can be assigned particular portions of media to caption, which can or can not be based on the language proficiency rating of the account. A server of the captioning system can enable real-time synchronization of captioning interfaces such that accounts can collaborate remotely in substantially real-time.

Figure 11:
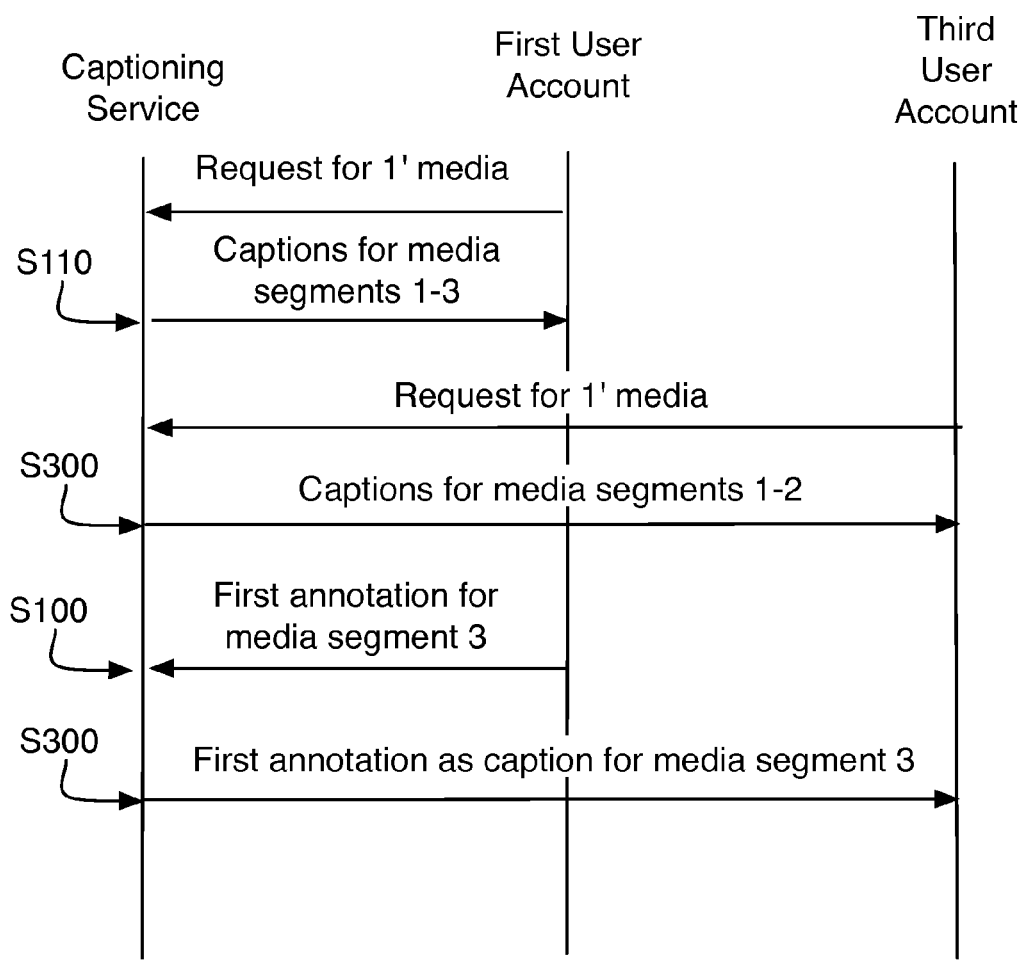
FIG. 11 is a schematic representation of a variation of the method, including dynamically updating the presented captions.

The method can additionally include dynamically updating the presented captions as shown in FIG. 11, which functions to present the most current version of the captions. The captions are preferably dynamically updated for a user that is streaming the media and captions. The captions are preferably dynamically updated in response to receipt of a new annotation (e.g., second annotation), wherein the new annotation is preferably presented to the viewing user as the caption for the respective media segment. One variation of the method includes streaming the video, audio, and captions in the first language to a fourth device substantially concurrently or slightly off-time with streaming the video, audio, and caption in the first language to the second device, and the captions in the first language streamed to the fourth device is dynamically updated with the second annotation received from the second device. Streaming the video, audio, and captions slightly off-time to the second and fourth device preferably includes streaming the media to the second user slightly before the media is streamed to the fourth user, wherein the second and fourth users are viewing different parts of the media at the same time.

The method can additionally include providing other suitable collaboration and editing tools such as grammar check, spell check, translation tools, task assignment, glossary tools, chat or discussion tools, caption navigation tools, rating tools, feedback tools, or any suitable tools to improve the captioning process. The task assignment tool preferably enables particular media segments, whole caption sets, and other portions of captions to be assigned to different accounts. For example, one account can reserve a block of captions for captioning so that no other account will duplicate the work on those captions. The glossary tool preferably functions to standardize the language of a caption set. Some translations can be translated with a variety of different phrases. The glossary tool can serve as a reference for standardized phrases or slang phrases. For example, one character could be referred to as a "boss", "chairman", "chief", or other suitable phrases, but the glossary tool can help different accounts use a standardized term for the character. The glossary tool can additionally enable automatic updating such that changing a standardized phrase in the glossary tool can update the phrase elsewhere. Additionally, the tool can semantically detect when a phrase should be used, and the glossary tool can suggest or automatically change the phrase to the standardized phrase. The caption navigation tools can enable the video to be navigated, searched, filtered based on current caption status the caption navigation tool can enable navigating to the first/last missing translation, going to the next missing translation, viewing only translations with low confidence, seeing translations made by a particular account, or performing any suitable caption navigation, search, and/or filtering operation.

The method can additionally include selecting a captioning language (first language) for the first and/or second user. In one variation of the method, the audio language (e.g., as determined from language tags, geo-tags, metadata, automatic language recognition, etc.) is different from the first language. Selecting the first language for the first and/or second user preferably includes selecting a language listed in the user profile of the respective user.

2.1 Caption Generation in Multiple Languages.

Figure 12A:
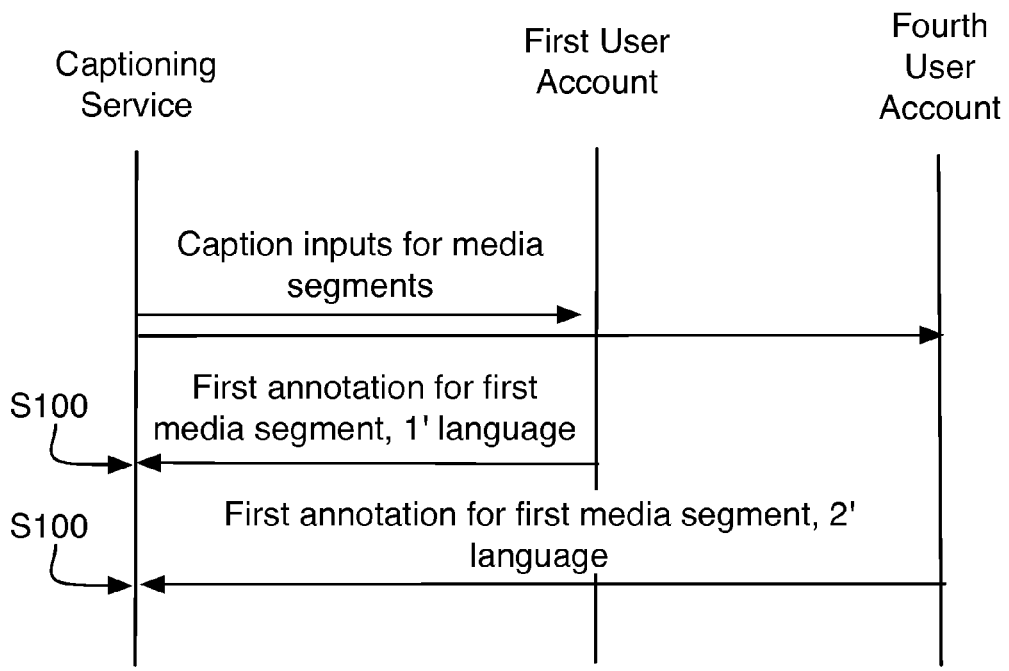
FIGS. 12A and 12B are schematic representations of a first and second variation of the method including generating captions in multiple languages.
Figure 12B:
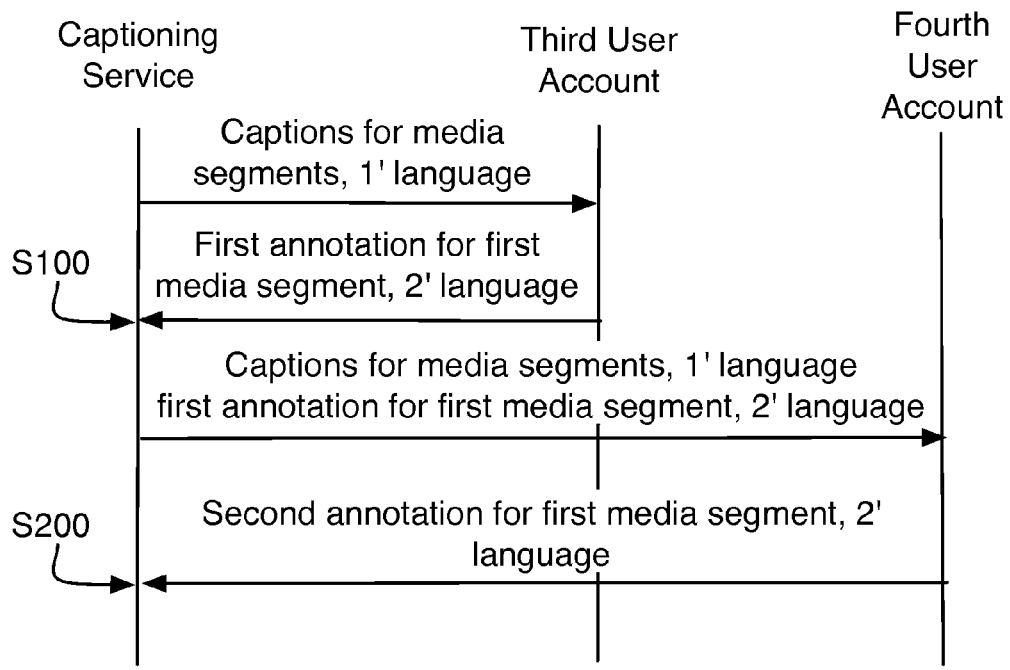

The method can additionally include generating captions in multiple languages. Generating captions in multiple languages can include receiving captions in different languages from different user accounts as shown in FIG. 12A (e.g., direct translations from the audio), automatically translating the captions in the first language into a second language, facilitating manual translation of the captions in the first language into the second language as shown in FIG. 12B, or any other suitable method of generating captions in multiple languages. The second language is preferably a different language from the first language. By allowing multiple users to simultaneously create captions in various languages for a given media segment and/or create captions in various languages across multiple media segments, generating captions in multiple languages enables concurrent generation of different-language caption sets.

In one variation of the method, the captions in the first language for the media are automatically translated into the captions in the second language. Automatic translation preferably includes machine translation, wherein the text of the captions in the first language are fed into a machine translation system, and the machine translation system output is preferably saved as the captions in the second language for the media segment/media. Alternatively, automatic caption translation can include identifying well-captioned media segments from a second piece of media, matching media segments between the first and second pieces of media, and saving the captions of the well-captioned media segments from the second piece of media as the captions of the matching media segments of the first piece of media. Well-captioned media segments can be media segments having a number of edits or versions over a predetermined threshold (e.g., over 3 caption versions), media segments with captions having a ranking over a predetermined threshold (e.g., a score of over 75%, as ranked by the user community), or can be any other suitable media segment having an indicator of reliable captioning. Matching the media segments of the first and second pieces of media preferably includes matching the audio waveforms/patterns of the media segments (e.g., within a given similarity threshold), but the media segments can be otherwise matched. Media segment matching is preferably audio frequency independent (e.g., wherein phrases are matched irrespective of a male or female voice), but can alternatively be audio frequency dependent (e.g., the same phrase in a female voice are matched, but the phrase in a male voice is not matched to the same phrase in a female voice). The caption for the well-captioned media segment for the second piece of media is preferably used as the caption for the matching media segment in the first piece of media. The identified well-captioned media segments are preferably in the same language as the captions for the first media.

The captions in the first language are preferably translated on a media segment basis, but can alternatively be translated as an entire caption file. Automatic caption translation is preferably limited to second languages that are related to the first language (e.g., English to German, Japanese to Korean, etc.), but can alternatively be unlimited. Alternatively, the first language can be a 'common' language, such as English, wherein data for translation from the common language to the second language (e.g., English to Spanish) is substantially abundant and/or reliable (e.g., above a predetermined threshold).

Automatically translating the captions in the first language to captions in the second language can additionally include presenting the captions in the second language to a user and receiving edits on the presented captions from the user. Presenting the captions in the second language to the user preferably includes rendering the captions in the second language at the devices of the user requesting captions in the second language for the media, but can alternatively include rendering a script of the captions in the second language for the user or otherwise presenting the captions in the second language to the user. The user is preferably a user that can read and write in the second language, but can be any suitable user. Receiving edits on the presented captions in the second language preferably includes receiving an annotation in a manner similar to receiving the second annotation from the second user for the media segment. However, the edits on the presented captions in the second language can be otherwise received from the third user.

In another variation of the method, the system facilitates translation of the captions in the first language into the second language by a third user. The third user is preferably a different user from the first and second users, and is preferably fluent in or can read/write in the first and second languages. Facilitating translation of the captions in the first language into captions in the second language preferably includes rendering a caption in the first language for a media segment at the third device and receiving an annotation as the caption in the second language for the media segment from the third device. The annotation is preferably saved as a first version of the caption in the second language for the media segment in a caption file for the second language. A caption input field for annotation input in the second language can additionally be rendered with the caption in the first language. The second language can be automatically recognized, or be indicated by user selection.

This variation can additionally include presenting the caption in the first language to a fourth user, and receiving a second annotation in the second language as the caption for the media segment, as shown in FIG. 12B. The fourth user is preferably different from the third user, and is preferably fluent in or can read/write the first and second languages. This functions to receive a second variation of the caption in the second language for the media segment. The second annotation in the second language can be saved as the current caption in the second language for the media segment, or can be saved as a version of the caption in the second language for the media segment. The first annotation in the second language for the media segment (received from the third user) can also be presented to the fourth user (e.g., rendered at the fourth user device) when the caption in the first language for the media segment is presented to the fourth user. In this variation, the second annotation is preferably an edit of the first annotation. The captions in the second language are preferably presented to the third and fourth users in a manner similar to caption presentation to the first and second users as described above but can be presented in any suitable manner.

Receiving captions in the second language can additionally include processing the multiple caption variations in the second language for each media segment and selecting a variation to present as the caption in the second language for the given media segment, similar to selecting a variation of the caption in the first language for the media segment for presentation. Captions in the second language for different media segments can be substantially simultaneously or concurrently received from multiple users, or can be received sequentially (e.g., one at a time).

Receiving captions in the second language can additionally include selecting the captioning language for the third or fourth user. The captioning language for third or fourth user is preferably selected in the manner described for selecting the first captioning language for first or second user, as described above. Selecting the captioning language for the third or fourth user can additionally include determining whether to display the captions in the first language to the third or fourth user. For example, when the user profile includes the audio language and the second language but not the first language, captions in the first language for the media segments are preferably not presented to the user (e.g., not rendered at the user device). When the user profile includes the first language and the second language, captions in the first language for the media segments are preferably presented to the user.

The method can additionally include selecting a presentation language for a user, which functions to select the caption set that should be presented (e.g. streamed and rendered) to the user. More preferably, the method includes selecting a presentation language for a user in response to receipt of a media streaming request from the user device and streaming and/or rendering the captions in the selected presentation language at the user device. The presentation language for the user can be selected manually or automatically. Manual selection of the presentation language preferably includes receiving a language selection from the user device. The language selection can be a selection of an icon associated with the language, a selection of the language from a drop-down list, or any other suitable language selection. Automatic language selection can include selecting a language associated with the user profile (e.g., listed as a fluent language in the user profile), selecting a language associated with the user profile and that has been historically selected by the user over a predetermined threshold (e.g., the presentation language is set to English when the user historically selects English as the caption language over 50% of the time), selecting a default language, selecting the last presentation language selected by the user, selecting the last captioning language used by the user, or any other suitable manner of automatically determining a suitable presentation language.

2.2 Media Segmentation.

Figure 13:
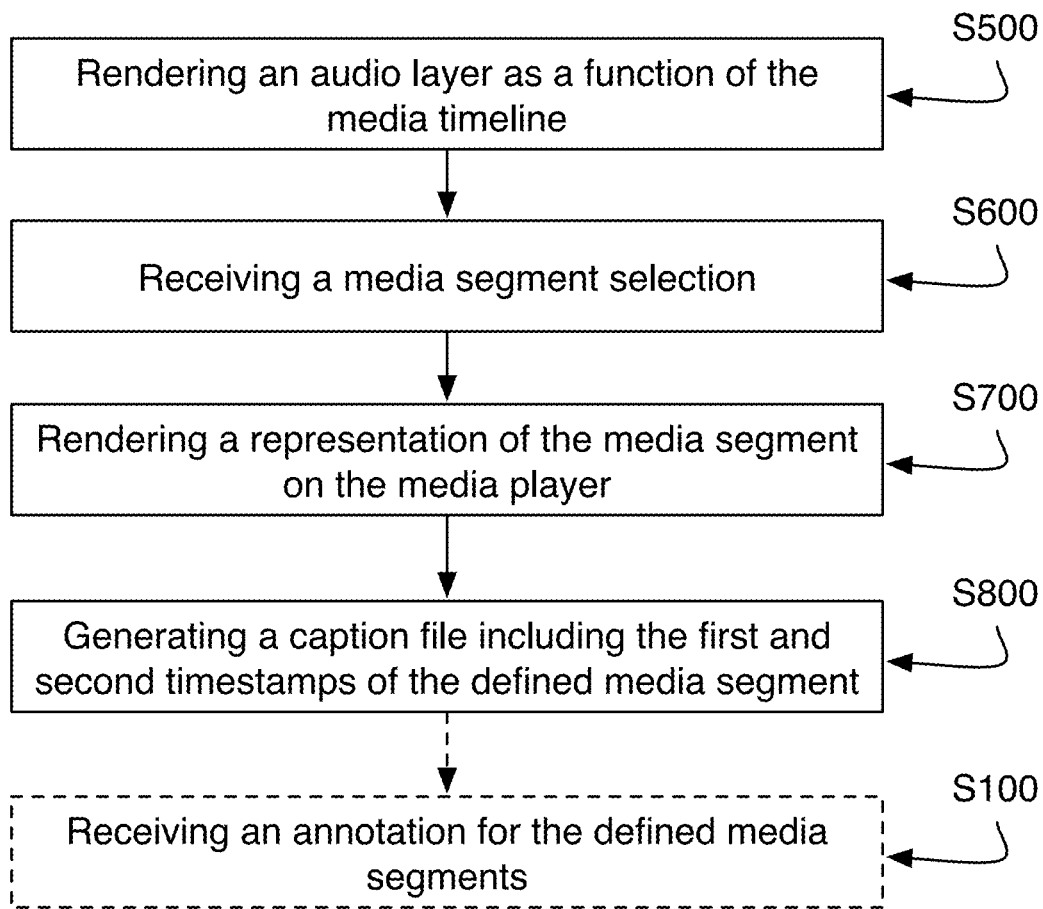
FIG. 13 is a flowchart representation of a method of segmenting the media.
Figure 15:
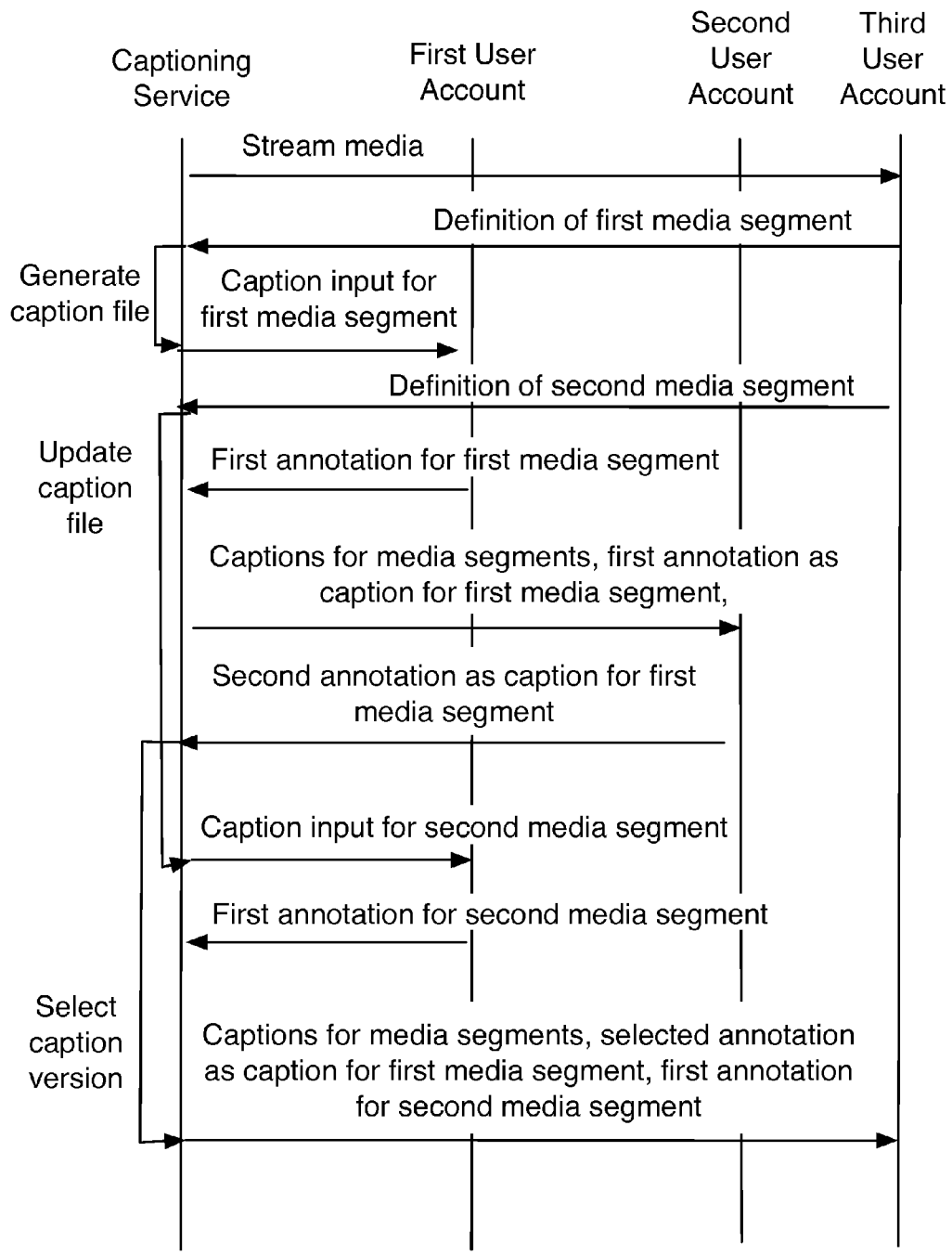
FIG. 15 is a schematic representation of a variation of the method.

The method can additionally include segmenting the media as shown in FIGS. 13 and 15, which functions to provide media segments for the users to caption. The media can be segmented automatically, semi-automatically, or manually by a user. The user manually segmenting the data is preferably a different user than the first or second users (e.g., a third, fourth, or fifth user), but can alternatively be any suitable user. The segments are preferably received from the user device or the user account, but can alternatively be received from any suitable construct associated with the segmenting user. Media segmentation can be performed substantially concurrently with media captioning for the same piece of media, wherein defined media segments are preferably substantially instantaneously available to users for captioning after identification (e.g., even while the remaining portions of the media are not segmented).

In one variation, a method for segmenting media for captioning can include rendering a visual representation of the audio along a timeline for the media S500; receiving a segment parameter of a media segment Shoo; representing the selected media segment S700; and generating a caption file comprising a caption associated with the start and end timestamps of the media segment S800. The method functions to enable easy and seamless segmentation and captioning of a video. The method additionally functions to enable collaborative segmentation and captioning of the video. By visually representing the audio as a function of the media timeline, this method provides a visual indicator of the most relevant variable to captioning. This allows users to use visual cues provided by the features of the audio visualization to more easily identify and select audio segments. The method is preferably implemented through a computer system configured for rendering an interface that is further configured for the execution of a method.

Rendering a visual representation of the audio (e.g., an audio layer) along a timeline for the media on the user device S500 functions to provide a visual audio layer in synchronization with the media timeline and the video. Rendering a visual representation of the audio also functions to provide an audio layer segmentation interface for receiving audio segmentation. The visual representation is preferably rendered as a graphical audio layer as a function of time, but can be otherwise visualized. The visual representation is preferably rendered as a waveform with at least one time-based graphical dimension. For example, the waveform can represent the audio amplitude of the video plotted over a horizontal time axis. The time axis can be directed in any suitable direction or be communicated in any suitable representation. The visual representation can additionally represent multiple frequencies (e.g., one waveform for a female voice and a second waveform for a male voice), multiple tracks, or any other suitable audio feature. In one variation, each speaker can have a rendered audio layer which enables a user to not only visually identify borders of a media segment, but easily segment the media based on the audio stream of the speaker (e.g., create media segments for each speaker). Preferably, the audio layer enables a user to visually detect the borders of spoken word (e.g., phrases or sentences). For example, in a video with two people having a conversation, the audio layer will have a waveform with some significant amplitude levels closely grouped when someone is speaking. During transitions between speakers or during pauses in a speech the waveform will have lower or even zero amplitude. The audio layer is preferably the audio track or combined audio tracks of the media. In an alternative embodiment, the audio layer can be a representation of processed audio. The audio can be processed to isolate speech or spoken word, processed to remove/reduce background noise, music, sound effects or other audio signals of little interest to captions, or processed in any suitable manner. The audio layer can alternatively represent multiple channels of audio such as right and left audio signals or multiple speaker audio feeds.

The visual representation of the audio preferably visualizes the audio over the entirety of the media timeline. Alternatively, a segment of the media audio can be visualized (e.g., the first half of the media). The audio layer is preferably synchronized to the play position or timestamp position of the video. The audio layer preferably represents a time-based plot of an audio signal synchronized to the current play position of the media. The audio layer will typically also represent audio signals preceding and/or succeeding the current play position. More preferably, the audio signal associated with the current play position is centrally located in the audio layer. During play progress and changes in the play position (e.g., fast forwarding, changing playback speed, skipping ahead, etc.), the audio layer progresses to render the audio signal appropriate for the context of the current play position. Alternatively, an icon indicative of the current play position progresses along a substantially stagnant audio layer/visual representation of the audio. In one variation, a method can enable the zooming in and/or zooming out of the audio layer, which functions to change the viewable portion and detail of the audio signal represented in the audio layer. Additionally, during the synchronized progress, media segments are preferably also rendered at corresponding time periods within the audio layer. The audio layer preferably progresses (e.g., scrolls) along with the play progress of the video. The media segments can be defined by a first and a second timestamp (e.g., a start and end time, respectively) that correspond to a time position in the media. Alternatively, the media segments can be defined (e.g., bounded or identified) by a start timestamp and a duration, a start video frame and an end video frame, a plurality of video frames, an audio signal, or any other suitable media parameter. Graphical representations of existing media segments are preferably rendered aligned to portions of the audio signal to which they correspond.

Rendering a visual representation of the audio preferably additionally includes processing the audio signal of the media to generate the visual representation. The visual representation is preferably generated and rendered before the media is played, but can alternatively be generated and rendered as the media is played, generated and rendered after the media is played, or generated and rendered in any other suitable order. In variations of the method where the captioning service hosts the media, the captioning service preferably processes the audio file and generates the visual representation at the captioning service servers, wherein the visual representation is sent to the receiving device along with the streamed media. In variations of the method where the media is streamed from a third party (e.g., a media hosting service), the system can visualize the audio in real-time (e.g., as the media is played), visualize the buffered audio (e.g., during or after the audio has buffered), visualize the played audio (e.g., visualize the audio after the media is played), record the audio and send the recorded audio to the captioning service for visualization, or visualize the audio in any other suitable manner. In these variations, the audio can be rerouted from the default audio output on the device (e.g., a speaker) through a virtual pass-through audio sharing system that generates the visual representation from the rerouted audio. The audio is preferably routed prior to media play by the user, but can alternatively be routed during media play by the user, wherein the video is preferably delayed correspondingly to maintain synchronization. However, the audio can be otherwise visualized.

Receiving a segment parameter of a media segment S100 functions to identify and define the media segment for caption assignment. Receiving one or more segment parameters media segment preferably defines the start and end of a media segment. While a first and a second segment parameter corresponding to the start and the end of the media segment are preferably received, a signal segment parameter or more than two segment parameters can alternatively be received. The segment parameter is preferably indicative of a start timestamp, but can additionally be indicative of a duration after the start timestamp or an end timestamp. Alternatively, the segment parameter can be indicative of a specific start video frame (e.g., video frame at which the caption should first be shown), an end video frame, identifiers for video frames during the media segment, or be indicative of any other suitable media parameter. Alternatively, the segment parameter can be the timestamps, the video frame identifiers, or any other suitable media parameter. Multiple media segments (captioning segments, or segments for captioning) can be selected. Segments can overlap in part or in whole.

Receiving a segment parameter for a media segment preferably includes receiving an input at the start timestamp (start of the media segment) and setting the end timestamp (end of the media segment) to the timestamp at which a stop event is detected. The input is preferably received at the device, and can be a keystroke, cursor selection (e.g., mouse, detected touch, stylus) on a first position of the visual representation, or any other suitable input. The stop event that defines the end timestamp can be the removal of a sustained input (e.g., the input that set the start timestamp), a selection of a end timestamp or second position on the visual representation different from the start timestamp or first position on the visual representation, or any other suitable stop event. Alternatively, the end timestamp can be automatically defined. For example, the end timestamp can be automatically set to be a predetermined time duration away (e.g., after) the start timestamp. Alternatively, the start timestamp can be automatically determined in response to the receipt of a user timestamp selection, wherein the start timestamp can be the timestamp corresponding to a media segment start feature (e.g., a amplitude minimum) nearest the user-selected timestamp. The end timestamp can be similarly automatically determined. Alternatively, the start timestamp can be set to the end timestamp of the preceding media segment.

Alternatively, a selection of a pre-defined media segment can be received. The pre-defined media segment can be a media segment having start and end timestamps previously defined by another user. Alternatively, media segments can be defined at least semi-automatically. The start and end timestamps can be automatically set in response to a user input. For example, a user can select a time point in the audio layer/visual representation, and a processing module can analyze the audio signal and find suggested timestamp confines. In yet another alternative, segmenting can be performed automatically by identifying segments within the audio and/or video of the media. Segments can be identified by detecting durations of audio track without speech patterns (e.g., for a given audio track or overall), and grouping segments based on the non-speech dividers. The automatically segmented media segments can be activated or enabled through user selection. However, the media segment selection can be otherwise received or determined. Selection of a pre-defined media segment preferably includes receiving a selection of a position representative of a time point within the confines of the media segment boundaries, but can alternatively include receiving a selection of an annotation associated with the media segment or include receiving a selection of any other suitable media segment identifier.

The segment parameter can be received at the visual representation of the audio signal, wherein a visual representation segment is selected. For example, a user can select (e.g., click on) a segment of the visual representation to select the corresponding audio segment. Alternatively, the media segment selection can be received independent of the visual representation. For example, the user can select and hold down a pre-mapped key during media play, wherein the media timestamp at the initial key selection is preferably set as the start timestamp (start timestamp), and the media timestamp at which the sustained input (e.g. key selection) is removed (stop event) is set as the end timestamp. Segments can alternatively be defined, selected, identified, or delineated through any manually controlled interface.

In one variation of the method, receiving a selection of the media segment includes receiving an input at a start timestamp of the media (wherein the media can be playing or can be paused), playing the media from the start timestamp while the input is sustained, and detecting the removal of the input at the end timestamp (stop timestamp). For example, a user can perform a "mouse down" on the audio layer at a point corresponding to a time of 1:12, drag the cursor to a point corresponding to a time of 1:35, and then perform a "mouse up". Upon releasing the mouse button, the media player can play the video from 1:12 to 1:35 and stop or alternatively loop that video portion. In an alternative of the method, the media is played from the start timestamp, and the end timestamp is set upon receipt of a second input (e.g. a second input of the mapped key).

The media can additionally play additional media content before and/or after the media segment (if media content exists) during segment selection. Such segment padding allows the media segment to be viewed with some context of preceding and succeeding media content. The media content selection can be quickly adjusted to add media portions to, or remove portions from, the media segment, which, in some variations, adds the portion of media shown in the media padding.

Additionally, selecting a media segment can include enforcing caption restrictions. Typically, the caption restrictions will be related to minimum and maximum caption lengths, which guides the segment duration. The minimum and maximum thresholds can be based on character count, word count, per-word reading speed, and other suitable approximations of reading speed. While the segment can be prevented from being a certain duration, a warning can alternatively be activated to notify a user of the caption duration issue. For example, if the selected media segment is too small for a given caption, the graphical representation in the audio layer can change colors. Ideally, a selected segment will have an adequate duration for a viewer of media content to read the caption. Thus, a minimum and maximum length thresholds are preferably set according to average caption length and reading speeds. Reading speeds can be determined from predetermined data for an individual or for a population, or determined empirically (e.g., by monitoring the user's eye movements). Additionally or alternatively, the media segment boundaries can be dynamically adjusted as the annotation is received, based on the length of the annotation. Thus as a caption is typed, the segment can automatically increase or decrease in size to conform to media segment thresholds. Alternatively, dynamic resizing of the media segment duration can be overridden by the user.

Representing the selected media segment S700 functions to visually represent the selected media segment and display the timing for the caption. The defined media segment is preferably rendered on the media player, but can alternatively be rendered elsewhere. The selected media segment is preferably represented (e.g., delineated, displayed, or indicated) on the visual representation of the audio signal, but can alternatively be represented on a graphical representation of the timeline, on a graphical representation of the video frames (e.g., wherein multiple sequential video frames corresponding to the timeline/visual representation of the audio signal are rendered), or represented on any other suitable representation of a media timeline. The media segment is preferably represented with a first boundary or anchor at a position representative of the start timestamp (start timestamp) and a second boundary or anchor at a position representative of the end timestamp (end timestamp). The selected segment is preferably represented by a first and a second icon (e.g., line perpendicular to the time axis, dot, etc.) positioned at a position corresponding to the respective timestamps, but can alternatively be represented by a window that bounds the selected media segment, represented by highlighting the selected media segment (e.g., on the timeline, audio layer, or video frames), or be represented in any other suitable manner. The media segment is preferably visualized as it is selected. In one variation of the method, the first boundary is rendered upon selection of the start timestamp (e.g., initial receipt of the input), and the second boundary is rendered upon selection of the end timestamp (e.g. detection of the stop event). In another variation of the method, the first boundary and second boundary are rendered upon selection of the start timestamp, wherein the second boundary is preferably rendered at a position representative of a predetermined time duration away from the start timestamp. Subsequent selection of an end timestamp preferably moves the second boundary to a position that represents the end timestamp. In variations where the end timestamp is set upon the removal of a sustained input during media play, the second boundary preferably moves in synchronization with, and represents, the currently playing position of the media. However, the selected media segment can be represented in any other suitable manner.

The boundaries of a media segment can additionally be modified, adjusted, augmented, edited, or otherwise updated by subsequently received user inputs (e.g., from the original segmenting user account or another user account), wherein the method can additionally include receiving a boundary modification and setting the start or end timestamp represented by the modified boundary to the timestamp value associated with the changed boundary. For example, the first or second boundary, once visualized, can be selected (e.g., clicked, selected by selection of a mapped key, etc.) and reset (e.g., dragged) to a new position on the visual representation, wherein the start or end timestamp associated with the reset boundary is preferably changed to reflect the timestamp value represented by the new boundary position. Alternatively, the boundaries can be changed through a numeric interface, wherein the user can increase, decrease, or enter a new timestamp value for a given timestamp. While modifying the start or end anchors (first and second boundaries, respectively) of a media segment, the media player can adjust video playback to reflect video portion included in the media segment. When moving the start or end timestamps (anchors) of a media segment to a different time portion, the media player can scrub or present the portion of the media for that position in the media. Multiple different boundaries for the same media segment can be received from multiple users, wherein the most commonly selected boundaries are preferably set as the respective timestamps within the caption file. Alternatively, the boundaries to be selected by a moderator, selected as a best-fit with a computer segmentation of the audio file, or otherwise selected.

Generating a caption file comprising a caption associated with the start timestamp and the end timestamp S800 functions to characterize all media segments for a media file into a data object. The media caption file preferably is configured for displaying the captions with the media during playback, and is preferably synchronized to the video and audio of the media. The media caption file is preferably stored as a data file, data stored in a parameter of a data model, or persisted in any suitable manner. In one variation, the media caption file is stored in association to the media file, such that the captioning will be available when playing the media file. In another variation, the media caption file is made as a downloadable or streamable resource. For example, a media hosting service can send a request to the captioning service to stream the captions to a receiving device when the receiving device requests media from the media hosting service. The caption file can be saved on the media repository storing the media, or can be saved on a separate server belonging to a separate service from that storing the media. The caption within the caption file can be empty (e.g., a null string), or can alternatively be populated with an annotation, such as text. Generating a caption file preferably includes updating or editing a pre-existing caption file, but can alternatively include creating a new caption file.

Figure 14A:
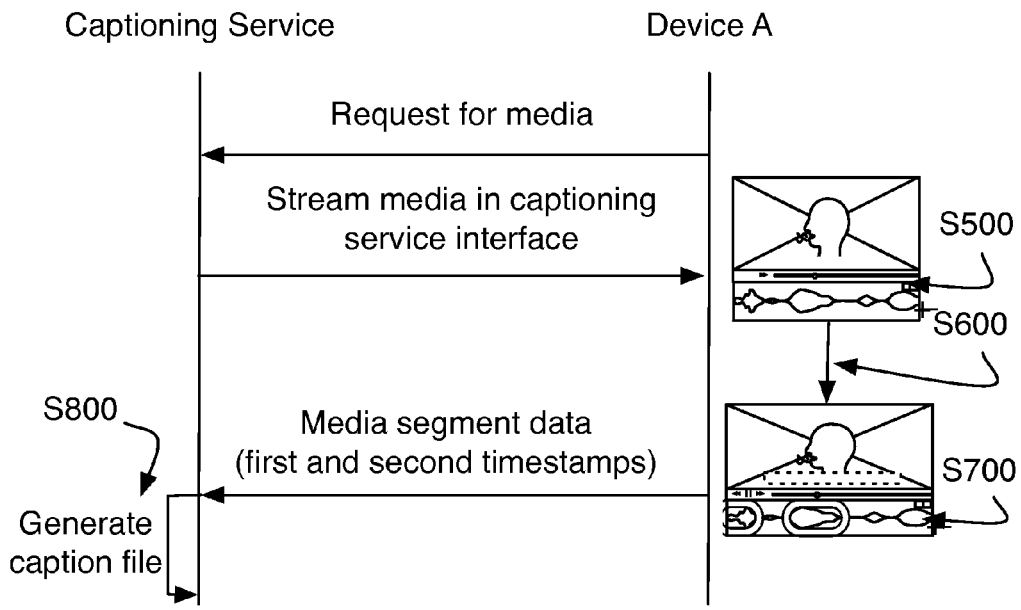
FIGS. 14A and 14B are schematic representations of a variation of the method, wherein a first user segments the media and a second user captions the media.
Figure 14B:
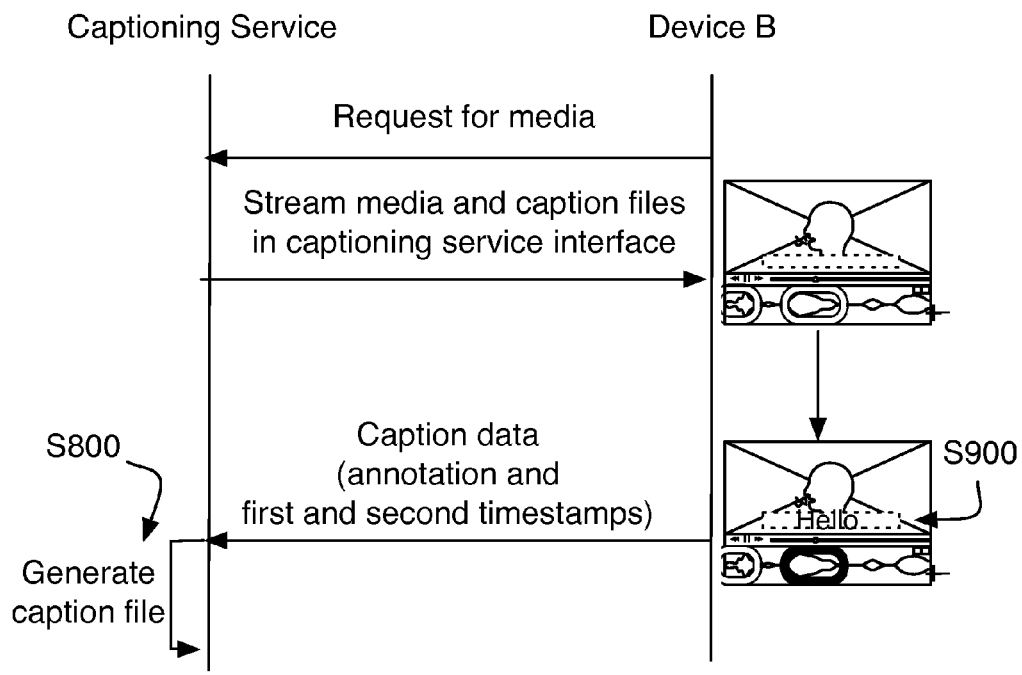

The method can additionally include receiving an annotation for a defined media segment from the segmenting user S900, which functions to assign content to the media segment captions. The segmenting user is preferably treated as first user, but can alternatively be a different user. Alternatively, as shown in FIGS. 14A and 14B, the annotation can be received from a user different from the segmenting user. The annotation (caption content) is preferably text, but can alternatively include other media used in captioning, such as graphics and/or voiceovers/re-recordings. Focus can be automatically set to the caption input field upon a user initiating or completing the identification/definition of a media segment such that a user can immediately type a caption after setting the timing of a media segment without intermediary input (e.g., keystrokes or cursor movement). This variation of the method includes receiving a media segment selection and immediately creating a caption box and directing focus to the caption box in response to the media segment selection, without intervening steps.

Alternatively, the annotation for the media segment is determined from an uploaded script, wherein the text of the script lines are matched to the relevant media segments based on timing, gender, scene, key frames, or any other suitable parameter. In another variation, the annotation is determined from a file that includes the annotation text associated with a start timestamp, wherein the annotation text is mapped to the correct caption within the caption file based on the start timestamp. For example, the annotation can be mapped to the caption having a start timestamp matching the start timestamp or mapped to the caption wherein the recorded annotation timestamp occurs between the respective start and end timestamp.

Alternatively, for a portion of media with no corresponding defined media segment, a user can input text in the annotation input field, and a media segment can be automatically created. In such a variation, the media segment can default to a predefined duration or use automatic determination of the duration, based on the audio or other factors. The text or other annotation content can be edited by selecting the corresponding media segment or by selecting the annotation input field displaying the annotation. The caption text is preferably a transcription of the speech of a video. The caption text can alternatively be a translation of the speech of a video, supplemental/subjective/informational text, translation of signs and other text, or any suitable content.

Additionally, the method can include setting caption parameters, which functions to set any additional aspects of a media segment. The caption parameters are preferably set through any suitable user interface. The caption parameters can include speaker assignment, captioning classification (speech, sound effect, music, written text translation, etc.), font styling, caption positioning, caption transitions, or any suitable property of a caption. For example, in a WYSIWYG caption interface, a user can be able to position the caption to any suitable area of a video segment. Accounts can additionally be able to comment and perform other collaborative actions on a media segment.

The system and method can be embodied and/or implemented at least in part as a machine configured to receive a computer-readable medium storing computer-readable instructions. The instructions are preferably executed by computer-executable components preferably integrated with a caption interface of an application or server hosted application. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method for captioning streamed media having video and audio, the method comprising:
   streaming the media to a first device associated with a first user account from a remote media repository;
   rendering a visual representation of the audio along a timeline of the media at the first device;
   receiving segment parameters that define a media segment bounded by a first timestamp and a second timestamp from the first user account;
   generating a caption file comprising a caption associated with the first timestamp and the second timestamp;
   receiving a first annotation associated with the defined media segment from the first user account;

editing the caption file, comprising saving the received first annotation as a version of the annotation for the caption associated with the first timestamp and the second timestamp;
streaming the media to a second device associated with a second user account from the remote media repository;
rendering the visual representation of the audio with icons corresponding to the first timestamp and second timestamp of the defined media segment;
receiving a second annotation associated with the defined media segment from the second user account;
editing the caption file, comprising saving the received second annotation as a version of the annotation for the caption associated with the first timestamp and the second timestamp;
automatically selecting one of the first or second annotations to be presented as the current version of the caption, wherein automatically selecting one of the first or second annotations comprises comparing the first and second annotations to an automatic machine translation of the audio of the defined media segment and selecting the annotation most similar to the machine translation;
streaming the media to a third device associated with a third user account; and
rendering the selected annotation for the defined media segment over video frames between the first timestamp and the second timestamp at the third device.

2. The method of claim 1, wherein receiving a first or a second annotation comprises:
receiving a selection of the defined media segment; and
receiving the first or the second annotation at a caption input field associated with the selected media segment.

3. The method of claim 2, wherein the caption input field comprises a text input associated with a video frame within the selected media segment.

4. The method of claim 1, further comprising receiving a boundary change from the second user account and updating the caption in the caption file with a timestamp corresponding to the changed boundary.

5. The method of claim 1, further comprising receiving segment parameters that define a second media segment bounded by a third and a fourth timestamp from the second user account; and adding the third and fourth timestamp associated with a new caption to the caption file.

6. The method of claim 1, wherein receiving segment parameters that define the media segment comprises receiving a selection of a segment of the visual representation.

7. The method of claim 6, wherein receiving a selection of a segment of the visual representation comprises:
receiving an input at the first timestamp;
playing the video and audio, starting from the first timestamp; and
detecting removal of the input and setting the second timestamp to the timestamp at which the input was removed, wherein the input is sustained during video and audio play.

8. The method of claim 7, wherein the input is a cursor selection of a position on the visual representation of the audio.

9. The method of claim 1, wherein the caption file is stored at the remote media repository.

10. The method of claim 1, wherein
selecting the annotation most similar to the machine translation comprises selecting one or more annotations having a similarity to the machine translation beyond a predetermined threshold or removing one or more annotations having a difference from the machine translation beyond a predetermined threshold,
wherein, in response to selecting more than one annotation having a similarity to the machine translation beyond a predetermined threshold, iteratively or randomly selecting and presenting the more than one annotation.

11. The method of claim 10, wherein having a similarity to the machine translation is determined by phrase convergence, similarity of words, or similarity of grammar and having a difference from the machine translation is determined by phrase divergence, difference of words, or difference of grammar.

12. A method for collaboratively captioning media including audio, the method comprising:
rendering a visual representation of the audio at a first device associated with a first user account;
receiving segment parameters corresponding to boundaries of a first media segment from the first user account;
receiving a first annotation for the first media segment from the first user account;
rendering the visual representation of the audio at a second device associated with a second user account, the second user account different from the first user account, the visual representation further comprising icons corresponding to the boundaries of the first media segment;
receiving a second annotation for the first media segment from the second user account;
automatically selecting one of the first or second annotations to be presented with the first media segment, wherein automatically selecting one of the first or second annotations comprises comparing the first and second annotations to an automatic machine translation of the audio of the first media segment and selecting the annotation most similar to the machine translation;
rendering the visual representation of the audio at a third device associated with a third user account, the third user account different from the first and second user accounts, the visual representation further comprising icons corresponding to the boundaries of the first media segment; and
rendering the selected annotation for the first media segment over video frames occurring between the boundaries of the first media segment.

13. The method of claim 12, further comprising receiving segment parameters corresponding to boundaries of a second media segment from the second user account.

14. The method of claim 12, further comprising receiving segment parameters corresponding to boundaries of a second media segment from the third user account.

15. The method of claim 12, further comprising receiving a segment parameter change for the first media segment from the second device and updating the first media segment boundaries based on the segment parameter change.

16. The method of claim 12, wherein the segment parameters are indicative of a first timestamp and a second timestamp, wherein receiving segment parameters corresponding to boundaries of the first media segment comprises progressing the media along a timeline; receiving a first input at a first timestamp; and receiving a second input at the second timestamp.

17. The method of claim 12, further comprising receiving segment parameters corresponding to successive media segments from the first device.

18. The method of claim 17, wherein receiving segment parameters corresponding to successive media segments from the first device comprises progressing the media along a timeline; during sustained receipt of a first input:
- receiving a second input at a first timestamp;
- receiving a third input at a second timestamp; and
- receiving a fourth input at a third timestamp;
- wherein the first media segment is defined between the first and second timestamps, and a second media segment is defined between the second and third timestamps.

19. The method of claim 12, further comprising streaming the media to the first, second, and third devices from a remote media repository.

20. The method of claim 12, wherein
- selecting the annotation most similar to the machine translation comprises selecting one or more annotations having a similarity to the machine translation beyond a predetermined threshold or removing one or more annotations having a difference from the machine translation beyond a predetermined threshold,
- wherein, in response to selecting more than one annotation having a similarity to the machine translation beyond a predetermined threshold, iteratively or randomly selecting and presenting the more than one annotation.

21. The method of claim 20, wherein having a similarity to the machine translation is determined by phrase convergence, similarity of words, or similarity of grammar and having a difference from the machine translation is determined by phrase divergence, difference of words, or difference of grammar.

* * * * *